(12) United States Patent
Yoshida

(10) Patent No.: US 7,813,372 B2
(45) Date of Patent: Oct. 12, 2010

(54) WIRELESS COMMUNICATION SYSTEM, WIRELESS COMMUNICATION APPARATUS, WIRELESS COMMUNICATION METHOD AND COMPUTER PROGRAM

(75) Inventor: Hidemasa Yoshida, Chiba (JP)

(73) Assignee: Sony Corporation, Tokyo (JP)

( * ) Notice: Subject to any disclaimer, the term of this patent is extended or adjusted under 35 U.S.C. 154(b) by 1796 days.

(21) Appl. No.: 10/895,073

(22) Filed: Jul. 21, 2004

(65) Prior Publication Data
US 2005/0047383 A1 Mar. 3, 2005

(30) Foreign Application Priority Data
Jul. 24, 2003 (JP) .............................. 2003-278830

(51) Int. Cl.
*H04L 12/413* (2006.01)
(52) U.S. Cl. ........................ 370/445; 370/338; 370/459; 370/442; 370/347
(58) Field of Classification Search ............. 455/452.1, 455/67.14, 67.11, 62, 423, 424, 450, 457; 370/338, 336, 395.21, 395.42, 445, 459, 370/442, 347
See application file for complete search history.

(56) References Cited

U.S. PATENT DOCUMENTS 6,011,784 A * 1/2000 Brown et al. ................. 370/329
6,600,754 B1 * 7/2003 Young et al. ................. 370/459
2001/0044308 A1 * 11/2001 Klank .......................... 455/452
2003/0169697 A1 * 9/2003 Suzuki et al. ................ 370/310
2004/0114521 A1 * 6/2004 Sugaya ........................ 370/238

FOREIGN PATENT DOCUMENTS

| JP | 7-143558 | 6/1995 |
| JP | 2003-8588 | 1/2003 |
| JP | 2003-008588 | * 10/2003 |

* cited by examiner

*Primary Examiner*—Ajit Patel
*Assistant Examiner*—Khai M Nguyen
(74) *Attorney, Agent, or Firm*—Oblon, Spivak, McClelland, Maier & Neustadt, L.L.P.

(57) ABSTRACT

In a self-organized distribution type wireless network without relationship between a controlling station and a controlled station, in order to execute a channel access by effectively utilizing a plurality of frequency channels, there is provided a communication system. In the system, a communication station determines a seed and generates a frequency channel switching pattern basing upon the seed. The seed is written in a beacon in each transmission frame to notify it to other stations. A new entry station scans all frequency channels, identifies a channel switching pattern of the frequency channels in accordance with the seed in the beacon received from another station, selects a candidate of a beacon transmission position and a transmission channel, and determines the beacon transmission position and transmission channel which are best for own station to transmit a beacon.

25 Claims, 15 Drawing Sheets

FIG. 10
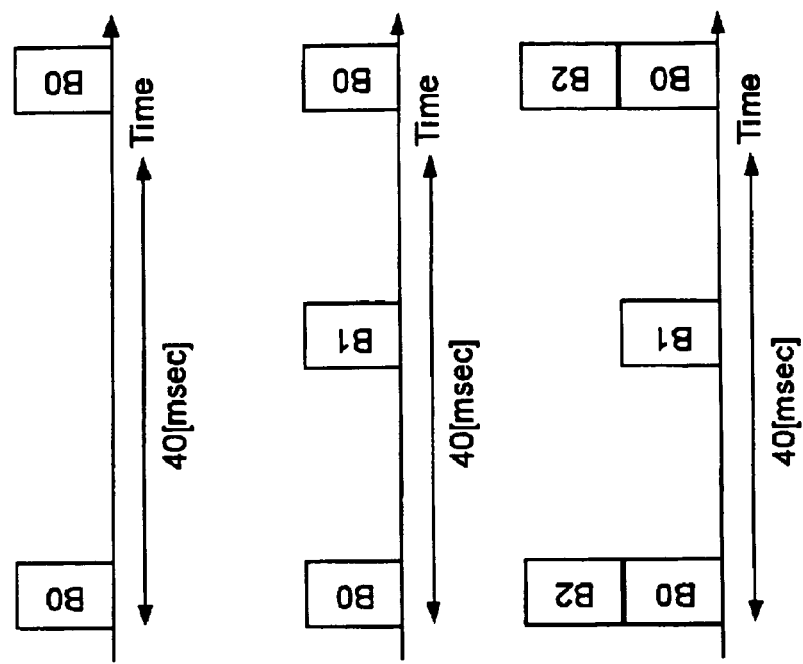
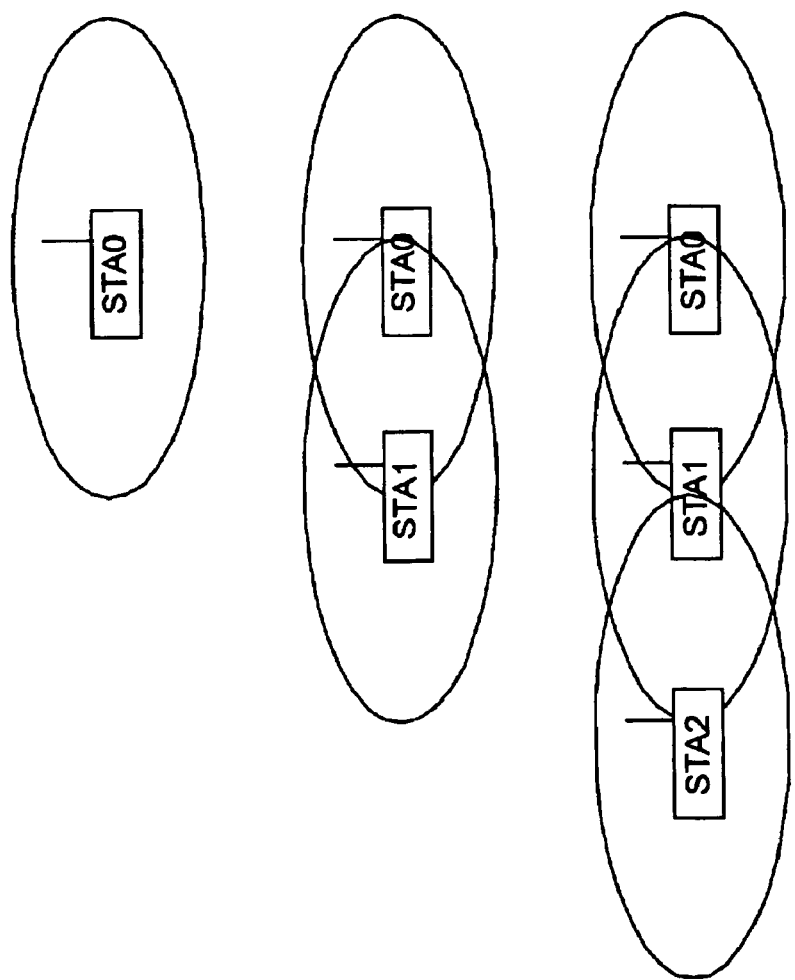

FIG. 13

| TIME | | BEACON TRANSMISSION NODE | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0 | 0 | B | c | d | e | f | g | h | I | j | k | l | m | n | o | p | a |
| 2.5 | 1 | a | B | c | d | e | f | g | h | I | j | k | l | m | n | o | p |
| 5 | 2 | p | a | B | c | d | e | f | g | h | I | j | k | l | m | n | o |
| 7.5 | 3 | o | p | a | B | c | d | e | f | g | h | I | j | k | l | m | n |
| 10 | 4 | n | o | p | a | B | c | d | e | f | g | h | I | j | k | l | m |
| 12.5 | 5 | m | n | o | p | a | B | c | d | e | f | g | h | I | j | k | l |
| 15 | 6 | l | m | n | o | p | a | B | c | d | e | f | g | h | I | j | k |
| 17.5 | 7 | k | l | m | n | o | p | a | B | c | d | e | f | g | h | I | j |
| 20 | 8 | j | k | l | m | n | o | p | a | B | c | d | e | f | g | h | I |
| 22.5 | 9 | I | j | k | l | m | n | o | p | a | B | c | d | e | f | g | h |
| 25 | 10 | h | I | j | k | l | m | n | o | p | a | B | c | d | e | f | g |
| 27.5 | 11 | g | h | I | j | k | l | m | n | o | p | a | B | c | d | e | f |
| 30 | 12 | f | g | h | I | j | k | l | m | n | o | p | a | B | c | d | e |
| 32.5 | 13 | e | f | g | h | I | j | k | l | m | n | o | p | a | B | c | d |
| 35 | 14 | d | e | f | g | h | I | j | k | l | m | n | o | p | a | B | c |
| 37.5 | 15 | c | d | e | f | g | h | I | j | k | l | m | n | o | p | a | B |
| 40 | 0 | B | c | d | e | f | g | h | I | j | k | l | m | n | o | p | a |
| 42.5 | 1 | a | B | c | d | e | f | g | h | I | j | k | l | m | n | o | p |
| 45 | 2 | p | a | B | c | d | e | f | g | h | I | j | k | l | m | n | o |
| 47.5 | 3 | o | p | a | B | c | d | e | f | g | h | I | j | k | l | m | n |
| 50 | 4 | n | o | p | a | B | c | d | e | f | g | h | I | j | k | l | m |
| 52.5 | 5 | m | n | o | p | a | B | c | d | e | f | g | h | I | j | k | l |
| 55 | 6 | l | m | n | o | p | a | B | c | d | e | f | g | h | I | j | k |
| 57.5 | 7 | k | l | m | n | o | p | a | B | c | d | e | f | g | h | I | j |
| 60 | 8 | j | k | l | m | n | o | p | a | B | c | d | e | f | g | h | I |
| 62.5 | 9 | I | j | k | l | m | n | o | p | a | B | c | d | e | f | g | h |
| 65 | 10 | h | I | j | k | l | m | n | o | p | a | B | c | d | e | f | g |
| 67.5 | 11 | g | h | I | j | k | l | m | n | o | p | a | B | c | d | e | f |
| 70 | 12 | f | g | h | I | j | k | l | m | n | o | p | a | B | c | d | e |
| 72.5 | 13 | e | f | g | h | I | j | k | l | m | n | o | p | a | B | c | d |
| 75 | 14 | d | e | f | g | h | I | j | k | l | m | n | o | p | a | B | c |
| 77.5 | 15 | c | d | e | f | g | h | I | j | k | l | m | n | o | p | a | B |
| 80 | 0 | B | | | | | | | | | | | | | | | |

WIRELESS COMMUNICATION SYSTEM, WIRELESS COMMUNICATION APPARATUS, WIRELESS COMMUNICATION METHOD AND COMPUTER PROGRAM

CROSS REFERENCES TO RELATED APPLICATIONS

The present document is based on Japanese Priority Document JP 2003-278830, filed in the Japanese Patent Office on Jul. 24, 2003, the entire contents of which being incorporated herein by reference.

BACKGROUND OF THE INVENTION

1. Field of the Invention

The present invention relates to a wireless communication system for mutual communication among a plurality of wireless stations such as a wireless LAN (Local Area Network), a wireless communication apparatus, a wireless communication method and a computer program, and more particularly to a wireless communication system, a wireless communication apparatus, a wireless communication method and a computer program, in which a wireless network is configured by Ad-hoc communication without relationship between a controlling station and a controlled station.

2. Description of Related Art

More in detail, the present invention relates to a wireless communication system, a wireless communication apparatus, a wireless communication method and a computer program, in which a self-organized distribution type wireless network is formed in a communication environment preparing a plurality of channels, without interference between neighboring wireless systems and without relationship between a controlling station and a controlled station, and more particularly to a wireless communication system, a wireless communication apparatus, a wireless communication method and a computer program, in which interference from adjacent wireless systems at spatial positions is reduced by switching a channel by effectively using a plurality of frequency channels.

By configuring a LAN by interconnecting a plurality of computers, information such as files and data and peripheral machines such as a printer can be shared, and information exchange such as transfer of e-mails and data content can be made.

Conventionally, a wired LAN connection is generally realized by optical fibers, coaxial cables or twist pair cables. However, in this case, line laying works are necessary, it is difficult to configure a network with ease, and a cable distribution becomes complicated. The motion range of apparatuses after the LAN configuration is limited by cable lengths, which is inconvenient.

A wireless LAN has drawn attention as a system releasing a user from LAN wiring of a wired system. According to a wireless LAN, most of wired cables can be omitted in a work space such as an office so that communication terminals such as personal computers can be moved relatively easily.

In recent years, demands for a wireless LAN system are increasing considerably because of its high speed and low cost. Introduction of a personal area network (PAN) has been studied recently in order to perform information communication by configuring a small scale wireless network among a plurality of electronic machines existing about each person. Different communication systems have been stipulated by utilizing frequency bands unnecessary for licenses by supervisory offices, such as a 2.4 GHz band and a 5 GHz band.

As one of the standard specifications of wireless networks, IEEE (The Institute of Electrical and Electronics Engineers) 802.11 (e.g., refer to Non-patent Document 1), HiperLAN/2 (e.g., refer to Non-patent Document 2 or Non-patent Document 3), IEEE 802.15.3, Bluetooth communication and the like can be enumerated. The IEEE 802.11 standard has various wireless communication schemes such as the IEEE 802.11a standard and the IEEE 802.11b standard depending upon a difference of a wireless communication scheme and a frequency band in use.

In order to configure a local area network by using wireless technologies, a method is generally used by which one apparatus to be used as a control station called an "access point" or a "coordinator" is installed in an area and a network is formed under the collective control by the control station.

When information is transmitted from some communication apparatus in a wireless network having distributed access points, an access control method based on band reservation has been adopted widely by which a band necessary for transmitting the information is first reserved at an access point to use a transmission path without collision of information transmission with other communication apparatuses. Namely, synchronous wireless communication is performed by mutually synchronizing with communication apparatuses in the wireless network by distributing access points.

In a case where asynchronous communication is to be performed between communication apparatuses on the transmission side and reception side in a wireless communication system having access points, this wireless communication requires by all means wireless communication via an access point so that there arises the problem that a transmission path use efficiency is decreased.

As another method of configuring a wireless network, "Ad-hoc communication" has been devised in which terminals perform wireless communication directly and asynchronously. It can be considered that the ad hoc communication in which arbitrary terminals perform wireless communication directly without using a particular access point is suitable particularly for a small scale wireless network configured by a relatively small number of clients positioned near each other.

In a work environment in which information machines such as personal computers (PC) are prevailing and a number of apparatuses are mixedly used in an office, it can be supposed that a plurality of networks are configured in a superposed manner with scattered communication stations. In this state, if the wireless network uses a single channel, there is no room of recovering the situations that another system intrudes during communication and that the communication quality is degraded by interference or the like.

To avoid this, a conventional wireless network system generally adopts a method by which a plurality of frequency channels are prepared for coexistence of other networks and a communication operation starts by making a wireless communication apparatus serving as an access point select one frequency channel.

The multi-channel communication scheme of this type can maintain a network operation and realize coexistence of other networks by switching a frequency channel to be used, when another system intrudes during communication or a communication quality is degraded by interference or the like.

For example, a high speed PAN system of IEEE 802.15.3 also prepares a plurality of frequency channels usable by the system and adopts the algorithm that after a power is turned on, a wireless communication device selects a usable frequency channel by executing a scan operation for all usable channels in order to confirm whether or not there are devices which are transmitting a beacon signal as the Piconet Coordinator (PNC) around the wireless communication device.

In an ad hoc network of a self-organized distribution type without relationship between a controlling station and a controlled station, resource management of frequency channels is important in order to suppress as much as possible interference with nearby different wireless networks under operation. However, in order to change frequency channels used in the network at a time, a representative station called a coordinator or an access point is required to instruct a use channel to each terminal station. In other words, it is difficult to switch a frequency channel in the ad hoc network.

In HiperLAN/2 for example, a method of changing frequency channels at a time can be considered in order to selectively use a plurality of channels. As shown in FIG. 17, an AP (base station) as a central control station repetitively notifies a frequency channel change, and, at some timing, AP and an MT (mobile station) connected to AP switch the channels at a time. A judgment whether the channel is switched or not is determined initiatively by AP. Information to be used for the judgment is collected by following a process procedure illustrated in FIG. 18. Specifically, the process includes the following procedures: (1) upon an instruction from AP, the connected MT temporarily suspends communication, scans other frequency channels to evaluate the channel quality, and sends the results to AP; (2) upon an instruction from AP, AP temporarily stops the transmission on a broadcast channel, and the connected MT scans the frequency channel in present use, evaluates the channel quality and reports the results to AP; and other processes.

Bluetooth communication adopts a method by which a central control station called a master serving as a standard performs random frequency hopping to utilize squarely each frequency channel. Existence of the central control station called the master is essential for the network configuration and the central control station is used as the standard of a frequency channel hopping pattern and synchronization of a time axis direction. If the master extinguishes, the network formed until then is once disconnected so that a process of selecting a new master is necessary.

Also in a wireless LAN system of the IEEE 802.11 series, since a network is formed by using the frequency channel initially set by an access point, it is difficult to configure an ad hock network without disposing a base station. When communication with MT covered by AP operating at another frequency channel is to be performed, it is necessary to connect APs by wired LAN cables. Namely, if covering APs are not connected, communication is not possible even if wireless communication apparatuses (terminals) physically existing adjacent to each other are covered by different APs.

Also in a high speed wireless PAN system of IEEE 802.15.3, although it is possible to initially scan all frequency channels and search a neighbor coordinator, if an operation starts once at a particular frequency channel, it is not possible to grasp the use state of other frequency channels. Therefore, even if a neighbor Piconet using a different frequency channel exists, communication with a wireless communication connected to the Piconet is impossible.

As above, the conventional methods require a complicated mechanism such as timings of frequency channel switching, a setup process to be realized by message exchange for starting a frequency channel switching operation through mutual synchronization of participating terminals, and an adjustment process to be used for determining frequency channel switching. It is also essential that a central control station initiatively performing control exists, such as AP in IEEE 802.11 and HiperLAN/2 and a master in Bluetooth communication. If the central control station such as AP and a master extinguishes, some protocol process of selecting a substitute central control station or a manual setting change work is necessary, resulting in the problem that communication is intercepted during this process.

A wireless communication system has been proposed which determines a frequency channel by measuring not only interference of own channel but also interference of adjacent channels by using these channels (e.g., refer to Patent Document 1), this system realizing a multi-channel with involvement of a base station.

[Patent Document 1]

Japanese Patent Application Publication Hei 6-37762

[Non-Patent Document 1]

International Standard ISO/IEC 8802-11:1999(E) ANSI/IEEE Std 802.11, 1999 Edition, Part II: Wireless LAN Medium Access Control (MAC) and Physical Layer (PHY) Specifications

[Non-Patent Document 2]

ETSI Standard ETSI TS 101-761-1 V1.3.1 Broadband Radio Access Networks (BRAN); HIPERLAN Type 2; Data Link Control (DLC) Layer; Part 1: Basic Data Transport Functions

[Non-Patent Document 3]

ETSI Standard ETSI TS 101-761-2 V1.3.1 Broadband Radio Access Network (BRAN); HIPERLAN Type 2; Data Link Control (DLC) Layer; Part 2: Radio Link Control (RLC) sublayer An object of the present invention is to provide an excellent wireless communication system, wireless communication apparatus, wireless communication method and computer program, which can properly configure a wireless network through ad hoc communication without relationship between a controlling station and a controlled station.

Another object of the present invention is to provide an excellent wireless communication system, wireless communication apparatus, wireless communication method and computer program, which can properly configure a suitable ad hoc network without any interference between communication stations in a communication environment preparing a plurality of channels.

Still another object of the present invention is to provide an excellent wireless communication system, wireless communication apparatus, wireless communication method and computer program, which can perform a channel access by effectively utilizing a plurality of frequency channels in a wireless network of a self-organized distribution type without relationship between a controlling station and a controlled station.

The present invention has been made in consideration of the above-described issues, and a first aspect of the present invention provides a wireless communication system for forming a network by a plurality of wireless communication apparatuses without relationship between a controlling station and a controlled station in a communication environment having a plurality of channels, characterized in that each wireless communication apparatus notifies beacon information containing seed information which is the basis of determining a beacon transmission timing and a transmission channel of its own station, when the wireless communication apparatus newly participates in the network, it identifies a channel switching pattern for beacon transmission on each channel, in accordance with the seed information in the information of a beacon received from another station, selects one candidate of own station from candidates not in use of the beacon transmission timing and transmission channel, and transmits the beacon information.

The "system" used in this specification means a logical collection of a plurality of apparatuses (or functional modules realizing specific functions) and does not specifically refer to whether each apparatus or function module is accommodated in a single housing.

In the self-organized distribution type wireless communication system, each communication station notifies beacon information in the transmission frame period and executes a scan operation for beacon signals from other stations to recognize the network configuration. In a self-organized distribution type network using multi channels, the transmission frames are multiplexed on the frequency axis as many as the number of usable channels. Therefore, a communication station cannot receive a beacon unless it moves to the same channel as that of another communication, at the beacon transmission timing, resulting in a problem that a new entry station is difficult to determine its own beacon transmission timing and transmission channel.

To solve this, the present invention configures a self-organized distribution wireless network using multi channels, by mutually notifying a channel transition pattern of beacon transmission to each communication station and by selecting the beacon transmission timing and transmission channel not subjected to interference.

In the multi-channel self-organized distribution wireless network of the present invention, each wireless communication apparatus determines the transmission channel for beacon information from those channels good to own station. If a communication station does not already exist in the neighboring area, an arbitrary channel switching pattern for defining own beacon transmission timing and transmission channel can be determined.

Further, at the time of a wireless communication apparatus trying to newly enter the network, the wireless communication apparatus determines the beacon transmission timing and transmission channel from the candidates excluding those having a bad communication quality relative to own station.

Still further, at the time of a wireless communication apparatus trying to newly enter the network, the wireless communication apparatus may determine the beacon transmission timing so as to make beacon transmission timings distribute time sequentially in the transmission frame on the selected channel. In order to effectively use communication resources, the transmission channel may be determined so as to distribute transmission channels on the frequency axis.

Further, in a case where the communication quality of some frequency channel is degraded in a steady state, a wireless communication station may determine the beacon transmission timing and transmission channel from the candidates excluding the degraded channels to switch the beacon transmission position and transmission channel.

A second aspect of the present invention provides a computer program written in a computer readable format for executing a process in a wireless communication environment without relationship between a controlling station and a controlled station, characterized by comprising a beacon transmission position control step of determining a beacon transmission timing and a transmission channel of own station, a seed information generating step of generating seed information uniquely corresponding to a channel switching pattern defining the determined beacon transmission timing and transmission channel of own station; a beacon information notifying step of notifying beacon information containing the generated seed information every predetermined frame period in own station communication range, and a beacon analyzing step of analyzing beacon information received from another station. In the computer program, in the beacon transmission position control step, at a time of new entry of a wireless communication apparatus, the channel switching pattern identified in accordance with the seed information extracted from the received beacon information is referred to and a candidate to be used by own station is selected from candidates of the beacon transmission timing and transmission channel not in use.

The computer program according to the second aspect of the present invention defines a computer program written in a computer readable format so as to realize a predetermined process on the computer system. In other words, as the computer program according to the second aspect of the present invention is installed in the computer system, a cooperative process is presented on the computer system to operate it as a wireless communication apparatus. A plurality of wireless communication apparatuses are activated to configure a wireless network so that similar operations and effects to those of the wireless communication system according the first aspect of the present invention can be obtained.

According to the present invention, an excellent wireless communication system, wireless communication apparatus, wireless communication method and computer program can be provided which can configure reliably a proper ad hoc network without any interference between communication stations in a communication environment preparing a plurality of channels.

Further, according to the present invention, an excellent wireless communication system, wireless communication apparatus, wireless communication method and computer program can be provided which can perform a channel access by effectively using a plurality of frequency channels in a self-organized distribution wireless network without relationship between a controlling station and a controlled station.

According to the present invention, interference from nearby wireless systems (e.g., systems in conformity with IEEE 802.11a and systems in conformity with HiperLAN/2 and HiSWANa) can be reduced effectively by switching the channel.

Further, according to the present invention, it is not necessary to use a complicated protocol for switching frequency channels at a time for terminals participating in a network. The present invention is also applicable when a plurality of frequency channels are required to be used effectively in a communication system providing a slot allowing each station to transmit data with priority after it transmits a beacon.

Other objects, features and advantages of the present invention will become apparent from the preferred embodiments of the present invention to be described later and the detailed description given in conjunction with the accompanying drawings.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 10 is a view showing how a new entry station arranges own beacon transmission timing on some frequency channel in accordance with the description in NBOI, while avoiding a collision with already existing beacons;

FIG. 13 is a view showing a structural example of a channel table for a frequency channel change pattern calculation;

DESCRIPTION OF THE PREFERRED EMBODIMENTS

The preferred embodiments of the present invention will be described in detail with reference to the drawings.

Communication transmission paths assumed in the present invention are wireless, and a network is configured among a plurality of communication stations by using transmission media constituted of a plurality of frequency channels. Communication assumed in the present invention is traffics of a storage exchange type, and information is transferred in the unit of a packet.

A wireless network system according to the present invention has a self-organized distribution type system structure not disposing a coordinator, and executes a transmission control effectively utilizing a plurality of channels by using a transmission (MAC) frame having a loosely synchronized time division multiple access structure. Each communication station can execute ad hoc communication for direct and asynchronous information transmission in accordance with an access procedure based on Carrier Sense Multiple Access (CSMA).

In the wireless communication system not disposing a control station as described above, that is, system without relationship between a controlling station and a controlled station, each communication station notifies beacon information to make another neighbor communication station (i.e., in a communication range) know the existence of own communication station, and informs of a network configuration. A communication station newly entering a communication range of some communication station can detect that it entered the communication range, by receiving a beacon signal, and can know the network configuration by analyzing information written in the beacon. Since the communication station transmits a beacon at the start of a transmission frame period, the transmission frame period at each channel used by each communication station is defined by a beacon interval.

The process to be executed at each communication station to be described hereunder is fundamentally a process to be executed by all communication stations participating in the ad hoc network of the present invention. However, in some cases, not all the communication stations constituting the network execute the process to be described hereunder.

Figure 1:
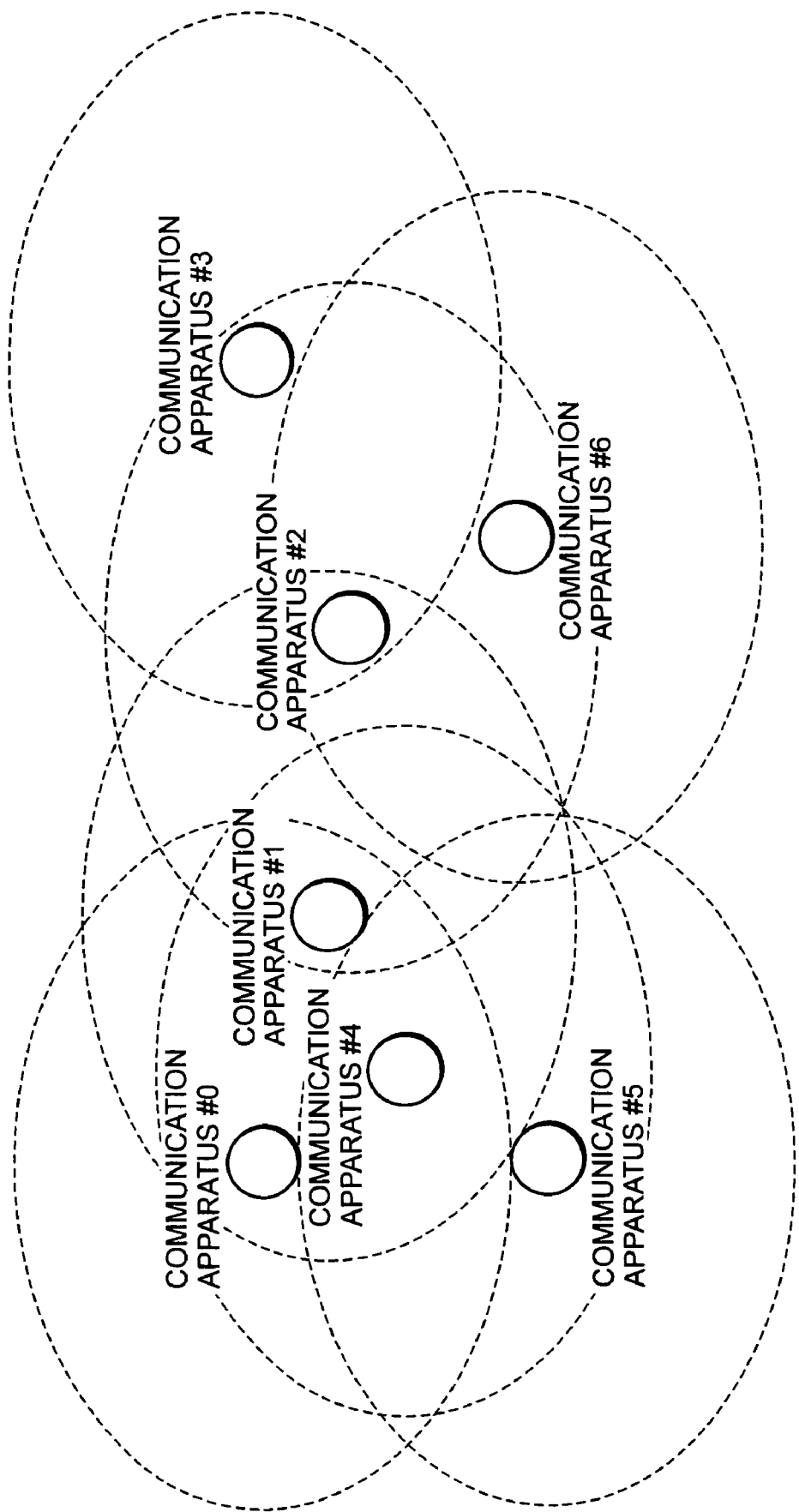
FIG. 1 is an example of the arrangement of communication apparatuses constituting a wireless communication system according to a preferred embodiment of the present invention.

FIG. 1 shows an example of the arrangement of communication apparatuses constituting a wireless communication system according to a preferred embodiment of the present invention. In this wireless communication system, a particular control station is not disposed and each communication apparatus operates in a self-organized and distributive manner to configure the ad hoc network. FIG. 1 shows the state that communication apparatuses #0 to #6 are distributed in the same space.

A communication range of each communication apparatus is indicated by a broken line in FIG. 1, and defined as not only the range in which communication with other communication apparatuses are possible but also the range that a signal transmitted from own station interferes. Namely, the communication apparatus #0 is in the range capable of communicating with the neighbor communication apparatuses #1 and #4, the communication apparatus #1 is in the range capable of communicating with the neighbor communication apparatuses #0, #2 and #4, the communication apparatus #2 is in the range capable of communicating with the neighbor communication apparatuses #1, #3 and #6, the communication apparatus #3 is in the range capable of communicating with the neighbor communication apparatus #2, the communication apparatus #4 is in the range capable of communicating with the neighbor communication apparatuses #0, #1 and #5, the communication apparatus #5 is in the range capable of communicating with the neighbor communication apparatus #4, and the communication apparatus #6 is in the range capable of communicating with the neighbor communication apparatus #2. While communication is performed between particular communication apparatuses, there is a communication apparatus, i.e., a "hidden terminal" which one partner communication apparatus can hear but another partner communication apparatus cannot hear.

In this embodiment, each communication apparatus performs an access control that one wireless transmission path is time divisionally utilized by considering mutual influence among other neighbor communication apparatuses.

Figure 2:
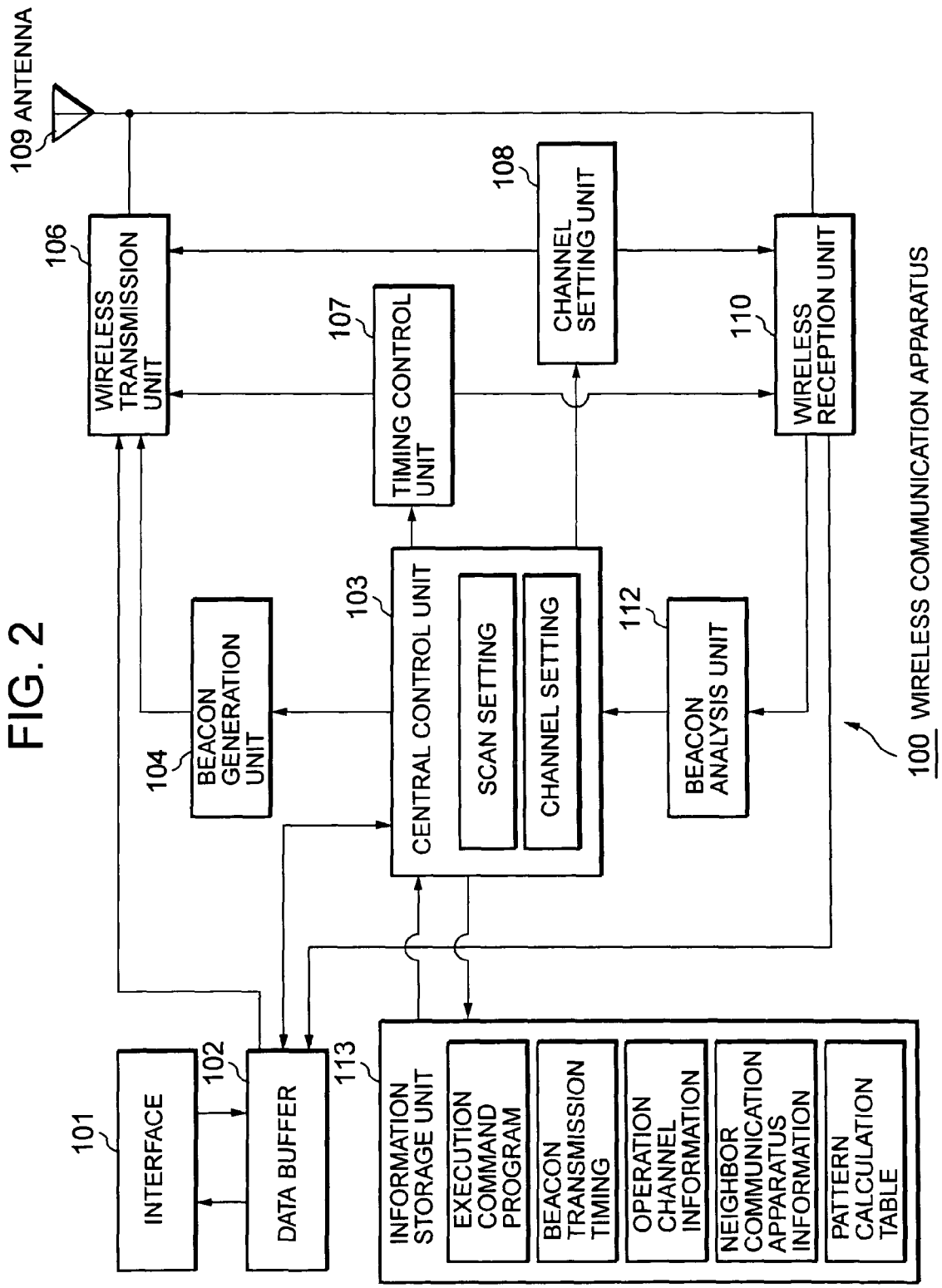
FIG. 2 is a schematic diagram of a functional structure of a wireless communication apparatus operating as a communication station in the wireless network according to a preferred embodiment of the present invention.

FIG. 2 is a schematic diagram of a functional structure of a wireless communication apparatus operating as a communication station in the wireless network according to a preferred embodiment of the present invention. The wireless communication apparatus shown can form a proper ad hoc network without interfering another wireless system by effectively performing a channel access in the same wireless system.

A wireless communication apparatus 100 is constituted of an interface 101, a data buffer 102, a central control unit 103, a beacon generation unit 104, a wireless transmission unit 106, a timing control unit 107, a channel setting unit 108, an antenna 109, a wireless reception unit 110, a beacon analysis unit 112 and an information storage unit 113.

The interface 101 exchanges various information with an external apparatus (e.g., a personal computer (not shown) or the like) connected to the wireless communication apparatus 100.

The data buffer 102 is used for temporarily storing data sent from an apparatus connected via the interface 101 or data received via a wireless transmission path, before the data is sent out via the interface 101.

The central control unit 103 collectively manages a series of information transmission and reception processes at the wireless communication apparatus 100 and performs an access control of each transmission path (scan setting, channel setting and the like in multi channels).

The beacon generation unit 104 generates a beacon signal to be periodically exchanged with neighbor wireless communication apparatuses. In order for the wireless communication apparatus 100 to run the wireless network, own beacon transmission slot position of each channel, own reception slot position of each channel, a reception slot position of a beacon from a neighbor communication apparatus of each channel, and own scan operation period of each channel are stipulated. This information is stored in the information storage unit 113 and written in the beacon signal to notify it to a neighbor wireless communication apparatus. The structure of a beacon signal will be later described. Since the wireless communication apparatus 100 transmits a beacon at the start of a transmission frame period, the transmission frame period of each channel used by the wireless communication apparatus 100 is defined by the beacon interval.

The wireless transmission unit 106 performs a predetermined modulation process in order to wirelessly transmit data and beacon temporarily stored in the data buffer 102.

The antenna 109 wirelessly transmits a signal to another wireless communication apparatus or collects a signal sent from another wireless communication apparatus.

The wireless reception unit 110 executes a process of receiving a signal of information and beacon sent from another wireless communication apparatus at a predetermined time. As a wireless transmission and reception method for the wireless transmission unit 106 and wireless reception unit 110, for example, various communication methods suitable for relatively near distance communication applicable to a wireless LAN may be applied. Specifically, a UWB method, an OFDM method, a CDMA method or the like can be adopted.

The timing control unit 107 controls timings for transmission and reception of a wireless signal. For example, it controls own beacon transmission timing at the start of the transmission frame period stipulated for each channel, a channel switching timing, a scan operation period of each channel, a reception timing of a beacon from another communication apparatus of each channel and the like. The channel setting unit 108 selects a channel via which a wireless signal of a multi-channel type is actually transmitted and received.

The beacon analysis unit 112 analyzes a beacon signal which was able to be received from another wireless communication apparatus to analyze existence and the like of another neighbor wireless communication apparatus. For example, information such as a beacon reception timing of each channel, a beacon transmission timing written in a beacon received from another communication apparatus, channel transition information, a reception slot position and a neighboring beacon reception slot position, is stored in the information storage unit 113 as neighbor apparatus information.

The information storage unit 113 stores therein an execution procedure command (a program for scan setting, channel setting and the like) for executing a series of access control operations and the like to be executed by the central control unit 103, a beacon transmission timing at another communication station, multi-channel information, neighbor apparatus information, channel transition information, a channel table (to be described later) for calculating a frequency channel change patter, and the like.

In this embodiment, in the communication environment preparing a plurality of channels, the wireless communication apparatus 100 operating as a communication station performs a transmission control by effectively using a plurality of channels by a transmission (MAC) frame having a loosely synchronized time division multiplex access structure or a communication operation such as a random access based on CSMA/CA, in an ad hoc network without disposing a particular control station.

Each communication station notifies beacon information to let another neighbor communication station (i.e., in a communication range) know the existence of own communication station, and informs of a network configuration. A communication station newly entering in a communication range of some communication station can detect that it entered the communication range, by receiving a beacon signal, and can know the network configuration by analyzing information written in the beacon.

A beacon transmission procedure at each communication station according to this embodiment will be described with reference to FIG. 3.

Assuming that information capable of being transmitted by a beacon is 100 bytes, the time taken to transmit it is 18 μs. Since one transmission is executed every 40 ms, a media occupying factor by a beacon at each communication station is as sufficiently small as one 2222-nd.

Each communication station synchronizes gently while hearing a beacon transmitted in a neighboring area. When a new communication station appears, the new communication station sets own beacon transmission timing so as not to collide with the beacon transmission timings of already existing communication stations.

If there is no communication station in a neighboring area, a communication station 01 can start transmitting a beacon. A beacon transmission interval is 40 ms (described already). In an example of the uppermost stage shown in FIG. 2, B01 indicates the beacon transmitted from the communication station 01.

A communication station newly entering the communication range thereafter sets own beacon transmission timing so as not to collide with the arrangement of already existing beacons. In this case, since each communication station acquires a transmission guaranteed period (TGP) immediately after beacon transmission, it is preferable that beacon transmission timings of respective communication stations are not congested but are uniformly distributed from the viewpoint of a transmission efficiency. Therefore, in this embodiment, transmitting a beacon starts basically at generally a middle point in the longest beacon interval period in a range where it is possible to hear the beacon. However, there may be a method by which beacon transmission timings of respective communication stations are arranged in a concentrated manner, and during the remaining transmission frame period, the reception operation is stopped to reduce the consumption power.

Figure 3:
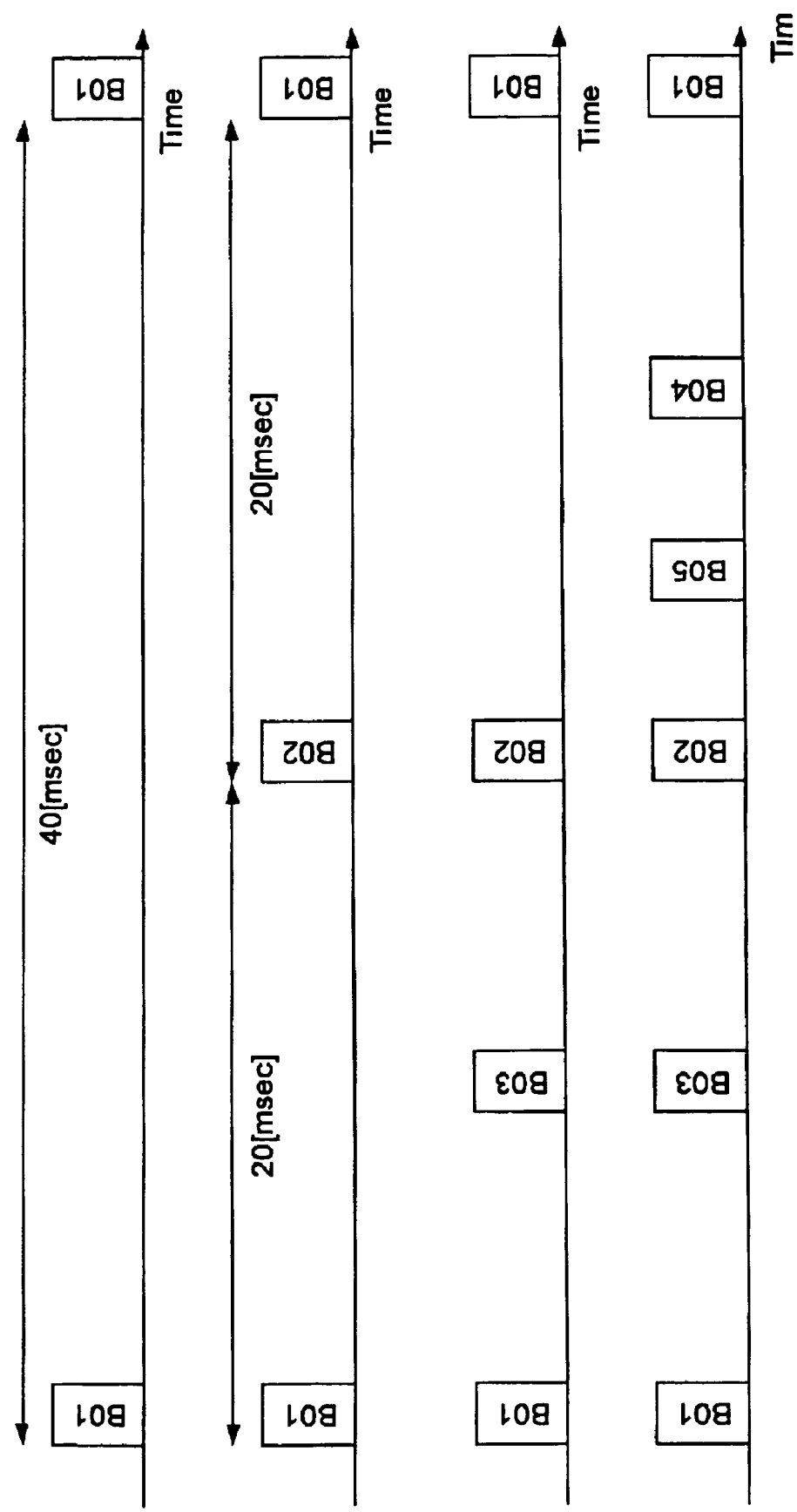
FIG. 3 is a view explaining a beacon transmission procedure at each communication station according to this embodiment.

It is assumed for example that a new communication station 02 appears in the network state that only the communication station 01 exists as shown in the uppermost stage of FIG. 3. In this case, the communication station 02 receives the beacon from the communication station 01 to recognize its existence and a beacon position, and as shown at the second stage of FIG. 3, sets own beacon transmission timing generally at the middle of the beacon interval of the communication station 01 to start beacon transmission.

It is assumed that another new communication station 03 appears. In this case, the communication station 03 receives at least one of the beacons transmitted from the communication station 01 and the communication station 02 to recognize the existence of these already existing communication stations. As shown at the third stage of FIG. 3, transmission starts generally at the middle of the interval of beacons transmitted from the communication station 01 and the communication station 02.

Subsequently, each time a new communication station participates in a neighboring area in accordance with the similar algorithm, the beacon interval is narrowed. For example, as shown at the lowermost stage of FIG. 3, a communication station 04 appearing next sets the beacon transmission timing at generally the middle of the beacon interval set by the communication station 02 and the communication station 01, and a communication station 05 appearing second next sets the beacon transmission timing at generally the middle of the beacon interval set by the communication station 02 and communication station 04.

A minimum beacon interval Bmin is defined so that the band (transmission frame period) is not made in excess of beacons. Two or more beacon transmission timings are not permitted to be set in Bmin. For example, if the minimum beacon interval Bmin is defined to be 2.5 ms in the transmission frame period of 40 ms, sixteen communication stations can be accommodated at a maximum in the range where radio waves can reach.

Figure 4:
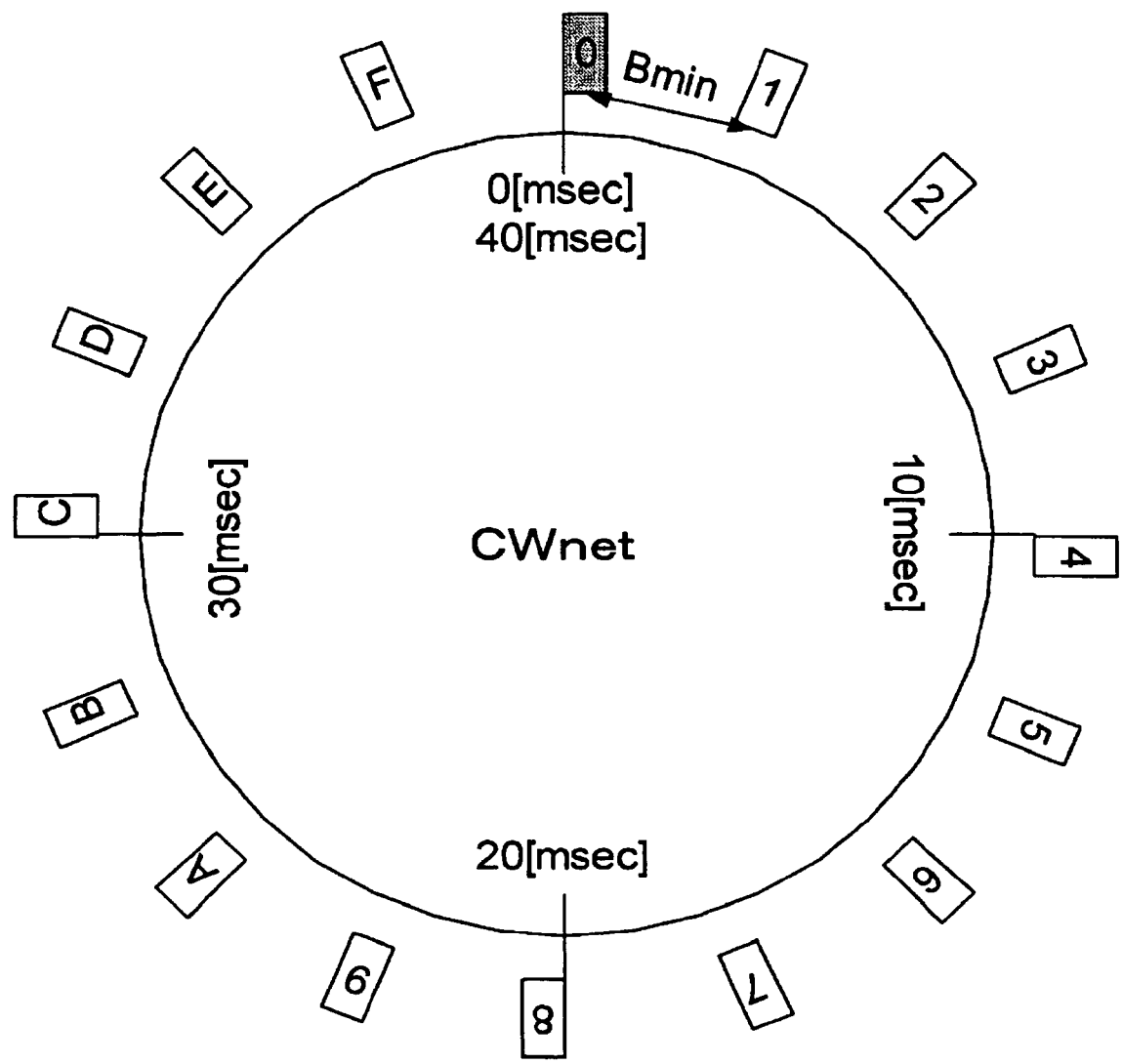
FIG. 4 is a new showing an example of beacon transmission timings.

FIG. 4 shows an example of beacon transmission timings. In this example shown in FIG. 4, a lapse of time in the transmission frame period of 40 ms is drawn as a clock whose hands move on a ring in a clockwise direction.

In the example shown in FIG. 4, sixteen communication stations 0 to F constitute nodes of the network. As described with reference to FIG. 3, it is assumed that beacons are disposed in accordance with the algorithm that beacon transmission timings of new entry stations are sequentially set generally at the middle of a beacon interval set by already existing communication stations. If Bmin is set to 2.5 ms, communication stations larger in number than that defined by Bmin cannot participate in the network. The detailed procedure for beacon transmission position determination will be given later.

Figure 5:
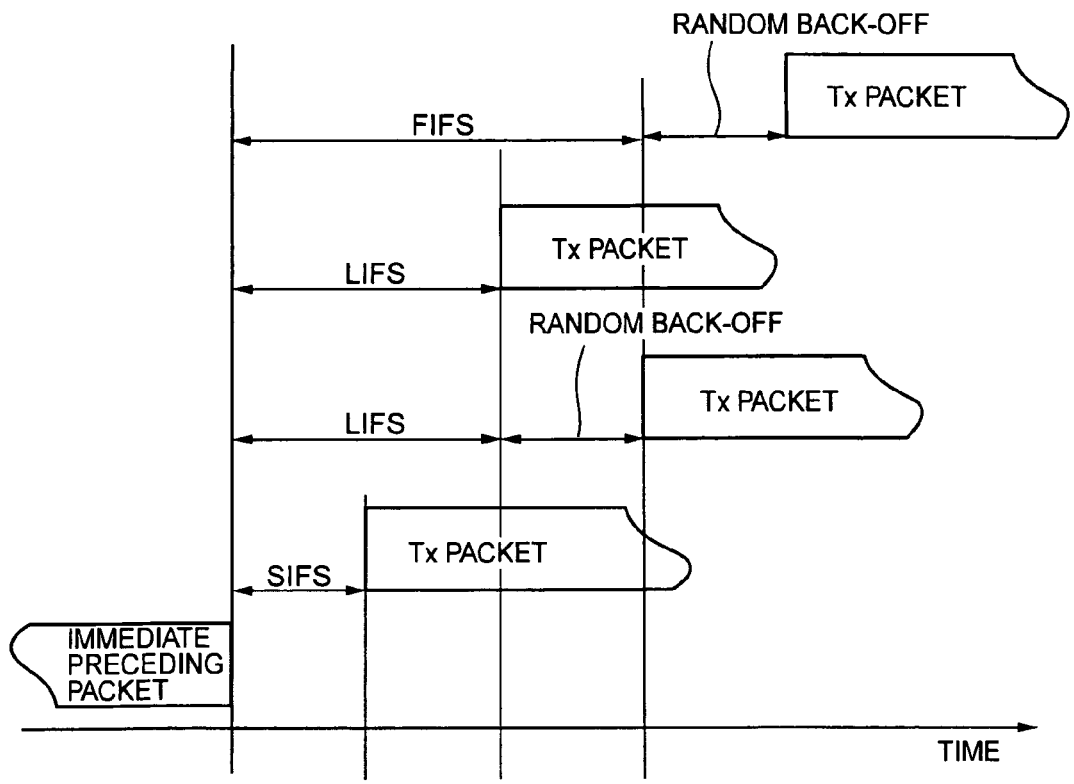
FIG. 5 is a view explaining definition of a packet interval.

Similar to the IEEE 802.11 method or the like, also in this embodiment a plurality of packet intervals are defined. The definition of a packet interval will be described with reference to FIG. 5. Defined for the packet interval are Short Inter Frame Space (SIFS) and Long Inter Frame Space (LIFS). Only those packets given a priority are allowed to be transmitted at the SIFS packet interval, and the other packets are allowed to be transmitted after is it confirmed that media are cleared by a packet interval of LIFS+a random back-off whose value is determined randomly. As a method of calculating a random back-off value, a method known in already existing techniques may be applied.

Also in this embodiment, in addition to the above-described packet intervals "SIFS" and "LIFS+back-off", the "LIFS" and "FIFS+back-off" (FIFS: Far Inter Frame Space" are defined. Although the "SIFS" and "LIFS+back-off" are generally applied, in the time period while some communication station is given a transmission priority, other stations use the packet interval "FIFS+back-off" and the station given the priority uses the packet interval SIFS or LIFS.

Figure 6:
FIG. 6 is a view showing how priority is assigned to a station which transmitted a beacon.
Figure 7:
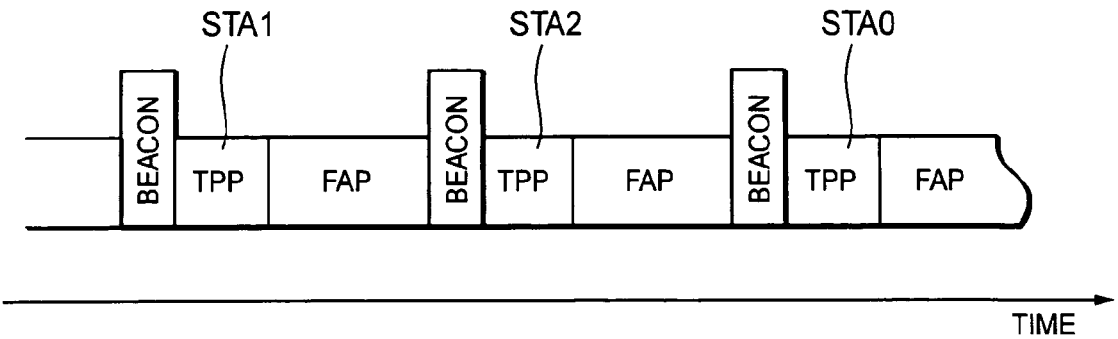
FIG. 7 is a view showing a structure of transmission frame periods.

Although each communication station transmits beacons at a constant interval, the station transmitted the beacon is assigned a transmission priority during some period after the beacon is transmitted. FIG. 6 shows how the priority is assigned to the station transmitted a beacon. This priority period is defined as Transmission Prioritized Period (TPP). The period other than TPP is defined as Fairly Access Period (FAP). FIG. 7 shows the structure of a transmission frame period. As shown in FIG. 7, after the communication station transmits a beacon, TPP is assigned to the communication station transmitted the beacon, and after the lapse of time corresponding to the length of TPP, FAP enters which is terminated when a next communication station transmits a beacon. In this example, although TPP starts immediately after the beacon is transmitted, the invention is not limited to this. For example, the start time of TPP may be set to a relative position (time) from the beacon transmission time.

The packet interval is studied again as in the following. Each communication station executes transmission at the interval of LIFS+back-off in the FAP period. Beacon and packet transmissions in TPP of own station are permitted at the SIFS interval. Packet transmission in TPP of own station is also permitted at the LIFS interval. Packet transmission in TPP of another station is performed at the interval of FIFS+back-off. In the IEEE 802.11 scheme, although the packet interval is always FIFS+back-off, in the structure of this example, the interval can be shortened so that a packet can be transmitted more efficiently.

In the above description, although only the communication station in TPP is assigned the prioritized transmission privilege, the prioritized transmission privilege is also assigned to a communication station called by the communication station in TPP. In TPP, transmission is fundamentally made preferentially. However, if there is no information to be transmitted from own communication station and another communication station has information to be transmitted to own communication station, then a Paging message or a Polling message may be sent to the "other station".

Conversely, if own station has no information to be transmitted although the beacon was transmitted and own station does not know that another station has information to be transmitted to own station, then this own station does not transmit any information and discards the transmission priority given in TPP. The other station starts transmission after the lapse of LIFS+back-off or FIFS+back-off even in this time period.

By considering the structure that TPP follows immediately after a beacon is transmitted as shown in FIG. 7, it is more preferable in terms of a transmission efficiency that the beacon transmission timings of each communication station are not congested but are uniformly distributed in the transmission frame period. Therefore, in this embodiment, fundamentally a beacon transmission starts generally at the middle of the longest beacon interval in the range where own station can hear it. However, there is a method by which beacon transmission timings of respective communication stations are arranged in a concentrated manner, and during the remaining transmission frame period, the reception operation is stopped to reduce the consumption power.

Figure 8:
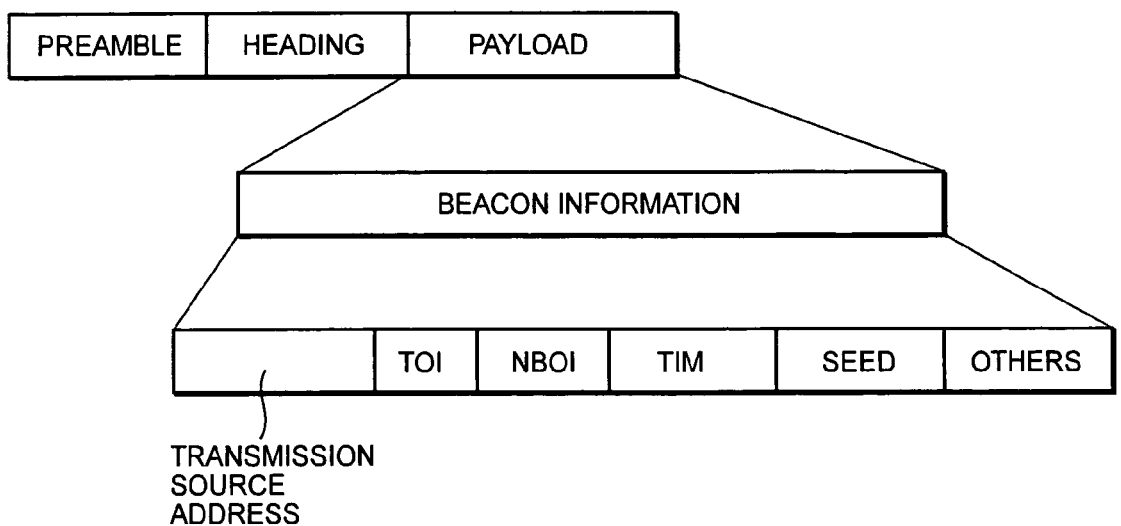
FIG. 8 is a view showing a structural example of a beacon signal format.

FIG. 8 shows an example of the structure of a beacon signal format. As shown in FIG. 8, a beacon signal has a preamble for notifying the existence of the signal, followed by a heading and a payload field PSDU. The heading field describes the information that the packet is the beacon. Information desired to be notified by the beacon, as follows, is described in the PSDU.

TX.ADDR: a MAC address of a transmission station (TX)

TOI: a TBTT offset indicator (TBTT Offset Indicator)

NBOI: neighbor beacon offset information

TIM: a traffic indication map

SEED: an initial value for calculating a frequency channel switching pattern.

TIM is annunciation information representative of that this communication station has presently information to be destined to which communication station. By referring to TIM, a reception station can recognize that the information is required to be received. SEED is the initial value for calculating the frequency channel switching pattern in accordance with a channel table (to be described later) for frequency channel change pattern calculation. The details of the frequency channel switching operation at a communication station will be later given.

NBOI is information representative of the arrangement of beacons of neighbor communication stations. In this embodiment, sixteen beacons can be disposed at each channel and in the transmission frame period at a maximum. Therefore, NBOI is structured as a 16-bit length field corresponding to each beacon position, and the information of the arrangement of beacons capable of being received is written in a bit map format. As a standard, 1 is written at a bit corresponding to a relative position of a beacon reception timing from each communication station, by using the beacon transmission timing of own station. A bit position corresponding to the relative position of a timing when a beacon is not received is kept unchanged to 0. In this embodiment, NBOI information is prepared for each of usable frequency channels.

Figure 9:
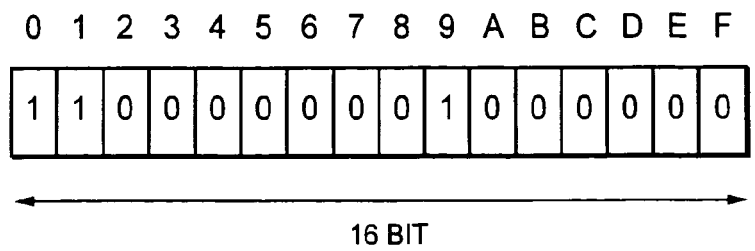
FIG. 9 is a view showing an example of a NBOI description.

FIG. 9 shows an example of a NBOI description. In the example shown in FIG. 9, the NBOI field notifies that a communication station 0 shown in FIG. 3 "can receive beacons from a communication station 1 and a communication station 9". A mark is assigned to a bit corresponding to the relative position of a receivable beacon if the beacon has already been received, and a space is assigned if the beacon is not still received. A mark may be assigned to the bit corresponding to the timing that the beacon is not still received, for the purposes other than the above description.

Each communication station receives beacon signals and in accordance with NBOI contained in each beacon signal, can arrange own beacon transmission timing so as to avoid collision of the beacon on each of usable frequency channels and can detect the beacon reception timing from another station.

FIG. 10 shows how a newly participating station arranges own beacon transmission timing on some frequency channel in accordance with the description in NBOI, while avoiding a collision with already existing beacons. Each stage shown in FIG. 10 indicates an entry state of communication stations STA0 to STA2. The left side of each stage indicates an arrangement state of each communication station and the right side indicates an arrangement of beacons transmitted from the stations.

The uppermost stage shown in FIG. 10 shows that only the communication station STA0 exists. STA0 tries to receive a beacon but cannot receive it so that it sets a proper beacon transmission timing and can start transmitting a beacon when this timing comes. A beacon is transmitted every 40 ms (transmission frame). All bits in the NBOI field described in the beacon transmitted from STA0 are 0.

The middle stage shown in FIG. 10 shows that STA1 enters within the communication range of the communication station STA0. STA1 tries to receive a beacon and receives the beacon from STA0. Since all bits in the NBOI field other than the bit corresponding to own transmission timing are 0, own beacon transmitting timing is set substantially at the middle of the beacon interval of STA0 in accordance with the above-described process procedure.

In the NBOI field of the beacon transmitted from STA1, 1 is set to the bit representative of own transmission timing and the bit representative of a reception timing of the beacon from STA0, and 0 is set to all other bits. As STA0 recognizes the beacon from STA1, 1 is set to the corresponding bit position of the NBOI field.

The lowermost stage shown in FIG. 10 shows that STA2 enters the communication range of the communication station STA1. In the example shown in FIG. 10, STA0 is a hidden terminal relative to STA2. Therefore, STA2 cannot recognize that STA1 receives the beacon from STA0 so that as shown in the right side, there is a possibility that STA2 transmits the beacon at the same timings as those of STA0 and a collision occurs.

The NBOI field is used to avoid this phenomenon. In the NBOI field of the beacon of STA1, 1 is set to the bit representative of own transmission timing and the bit representative of the beacon transmission timing of STA0. Although STA2 cannot directly receive the beacon transmitted from the hidden terminal STA0, STA2 can recognize the beacon transmission timing of STA0 from the beacon received from STA1 and can avoid the beacon transmission at this timing.

Figure 11:
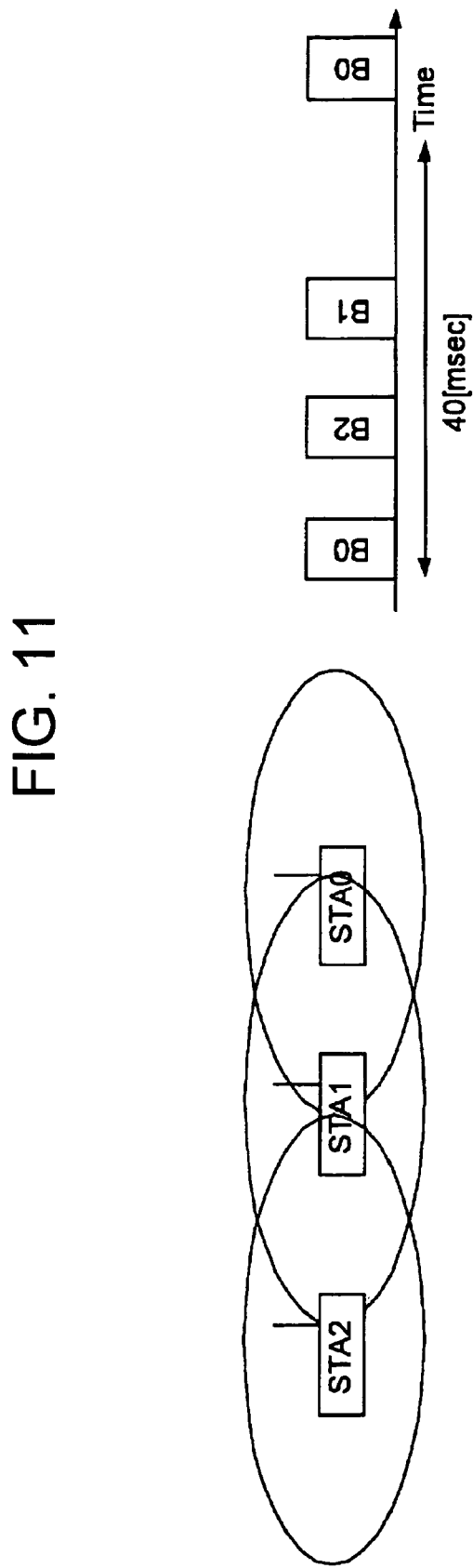
FIG. 11 is a view how the new entry station arranges own beacon transmission timing while avoiding the beacon transmission timing of a hidden terminal on the basis of received beacon information.

As shown in FIG. 11, STA2 sets the beacon transmission timing substantially at the middle of the beacon interval of STA0 and STA1. Obviously, in NBOI of the beacon transmitted from STA2, 1 is set to the bits representative of the beacon transmission timings of STA2 and STA1. With the beacon collision avoiding function based upon the description in the NBOI field, the beacon position of the hidden terminal, i.e., the neighbor station two stations ahead can be grasped and a beacon collision can be avoided.

Figure 12:
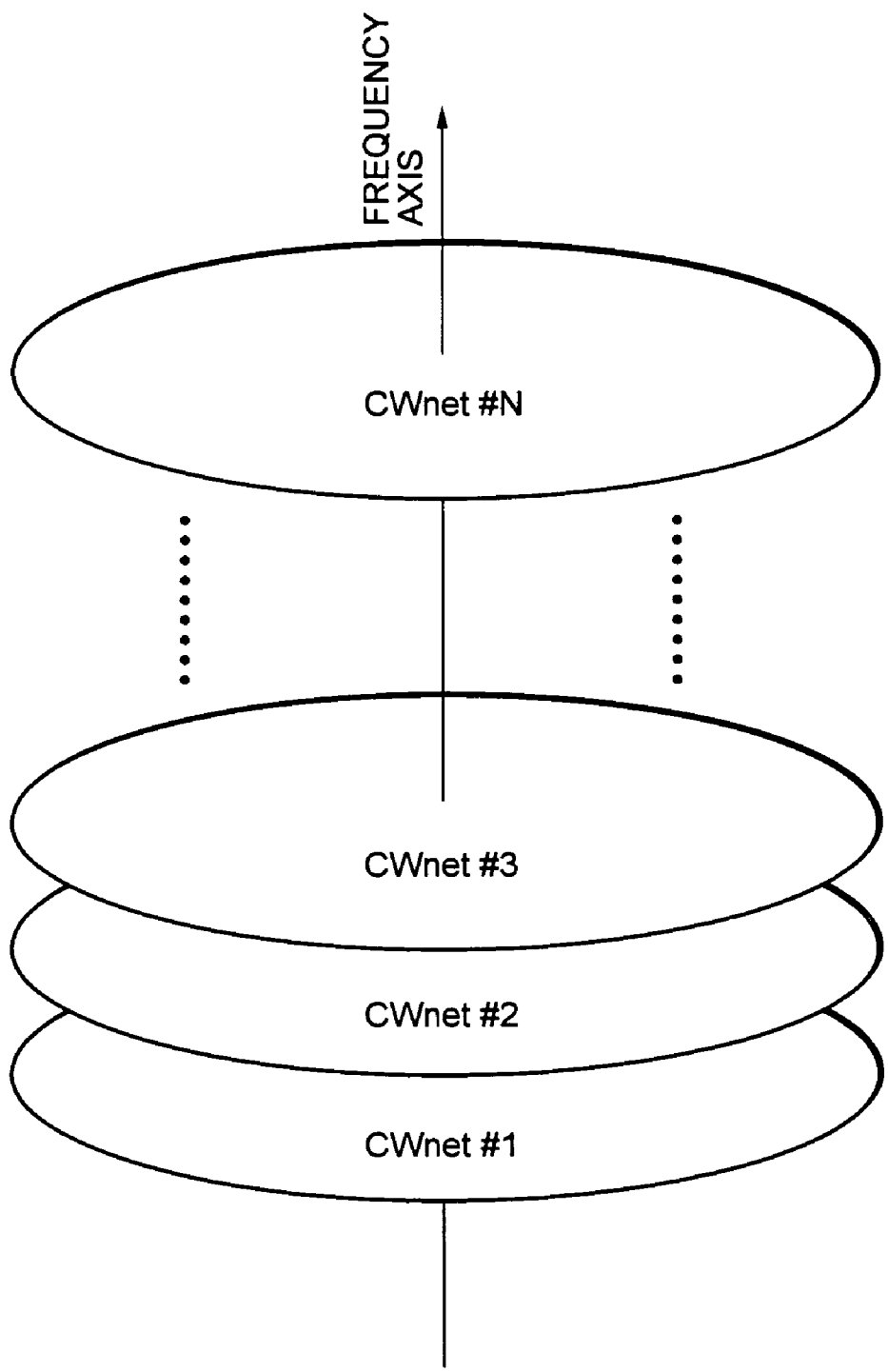
FIG. 12 is a view schematically showing a transmission frame structure of a self-organized distribution type multi-channel wireless communication system.

As above, in a self-organized distribution type wireless communication system, each communication station notifies beacon information in the transmission frame period and beacon signals from other stations are scanned so that the network configuration on each channel can be recognized. In a case of the multi-channel self-organized distribution type network of this embodiment, however, the transmission frames such as shown in FIG. 4 corresponding in number to the number of usable channels are disposed on the frequency axis (refer to FIG. 12). Therefore, each communication station cannot receive a beacon unless it moves to the same channel at the beacon transmission timing of another communication, and cannot grasp the network configuration of each channel. In other words, a new entry station is difficult to determine own beacon transmission timing and transmission channel.

In this embodiment, therefore, the self-organized distribution wireless network utilizing multi channels is configured by mutually notifying a channel transition pattern of beacon transmission among communication stations to select a beacon transmission timing and transmission channel not interfering with each other.

Description will be made on fundamental operation procedures at each communication station of the multi-channel self-organized distribution type wireless network of this embodiment.

(1) A communication station intending to newly enter the network first scans all usable frequency channels, and evaluates the communication quality of each frequency channel. The evaluation method for the communication quality is not specifically limited.

(2) The frequency channel judged optimum for own station to transmit a beacon is determined in accordance with the evaluation result of the communication quality. The method of determining a frequency channel for beacon transmission is not specifically limited.

(3) An initial value (SEED) for generating a frequency channel switching pattern is determined. A seed determining method is not specifically limited. For example, the seed may be generated by using a random number.

(4) A frequency channel switching pattern is generated in accordance with the generated seed. For example, the frequency channel switching pattern may be generated by using a channel table for frequency channel change pattern calculation such as shown in FIG. 13.

(5) In accordance with the channel change pattern obtained from the channel table for frequency channel change pattern calculation, beacon transmission and data transmission/reception are performed at predetermined timings while the frequency channel is changed.

The channel table for frequency channel change pattern calculation shown in FIG. 13 has a table structure to be used by the wireless communication system that the table has sixteen frequency channels and that the transmission frame period of 40 ms of each channel is equally divided into sixteen sections to dispose a beacon transmission position at an interval of 2.5 ms.

For example, if some communication station determines the channel #1 as the optimum channel and generates a seed B, the communication station transmits a beacon at the beacon transmission timing of the second beacon position #1 of the transmission frame. Thereafter, a beacon is transmitted at the third beacon position #2 when the channel is hopped to the channel #2, and a beacon is transmitted at the fourth beacon position #3 when the channel is hopped to the channel #3. In this manner, the channel hopping is performed in accordance with the obtained channel change pattern, and beacon reception or beacon transmission, when necessary, are sequentially performed in each channel at a transition destination. With the communication quality evaluation, hopping to an unusable channel due to interference or the like and a beacon transmission/reception operation relative to the unusable channel can be omitted.

(6) The communication station executes a scan operation at each channel at the transition destination in the procedures (1) and (2). The scan operation sequence in multi channels is not specifically limited. If a beacon transmitted from another communication station is detected, it is judged that the wireless network has already been configured and is running.

(7) When a beacon is received from another communication station, an analysis process is executed. For example, neighbor apparatus information is stored including a reception timing of a beacon at each channel, a beacon transmission timing described in a beacon received from another communication apparatus, channel transition information, a reception slot position, a neighbor beacon reception slot position and the like.

In this embodiment, when a seed for calculating the frequency channel switching pattern contained in the information of a received beacon is read, the transmission position in the transmission frame and frequency channel switching pattern are extracted from the information of the received beacon.

(8) The beacon reception information (NBOI) of another station contained in the received beacon is further read to generate a list of beacon transmission positions not in use.

(9) An optimum channel for own beacon is selected from the frequency channels corresponding to the beacon transmission positions generated at the procedure (8).

(10) A beacon transmission/reception operation and a frequency channel switching operation start in accordance with the frequency channel switching pattern extracted at the procedure (7).

In addition to calculating the channel table for frequency channel change pattern calculation such as shown in FIG. 13, the method of identifying the channel switching pattern of a communication station may prepare a function for calculating the channel switching pattern in accordance with the seed described in a received beacon and may sequentially calculate the channel switching pattern in response to the reception of a beacon from another station.

When a beacon is received, a seed S and a use channel CH of a communication station at the transmission source can be obtained. It is therefore sufficient if functions f, g and h are prepared. The function f determines the beacon position BP in the transmission frame in accordance with the seed S and use channel CH. The function g determines the channel CH to be changed in accordance with the seed S and beacon position BP. The function h determines the channel CH_next at the next beacon position in accordance with the seed S and a current channel CH_current.

BP=f (S, CH)
CH=g (S, BP)
CH_next=h (S, CH_current)

Structural examples of the functions will be described below.

Example 1 f (S, CH)=(CH+S) mod N
g (S, CH)=(BP−S) mod N
h (S, CH)=(CH+1) mod N

Example 2 f (S, CH)=(((S+CH) mod MAX_CH) mod MAX_BP)

Figure 14:
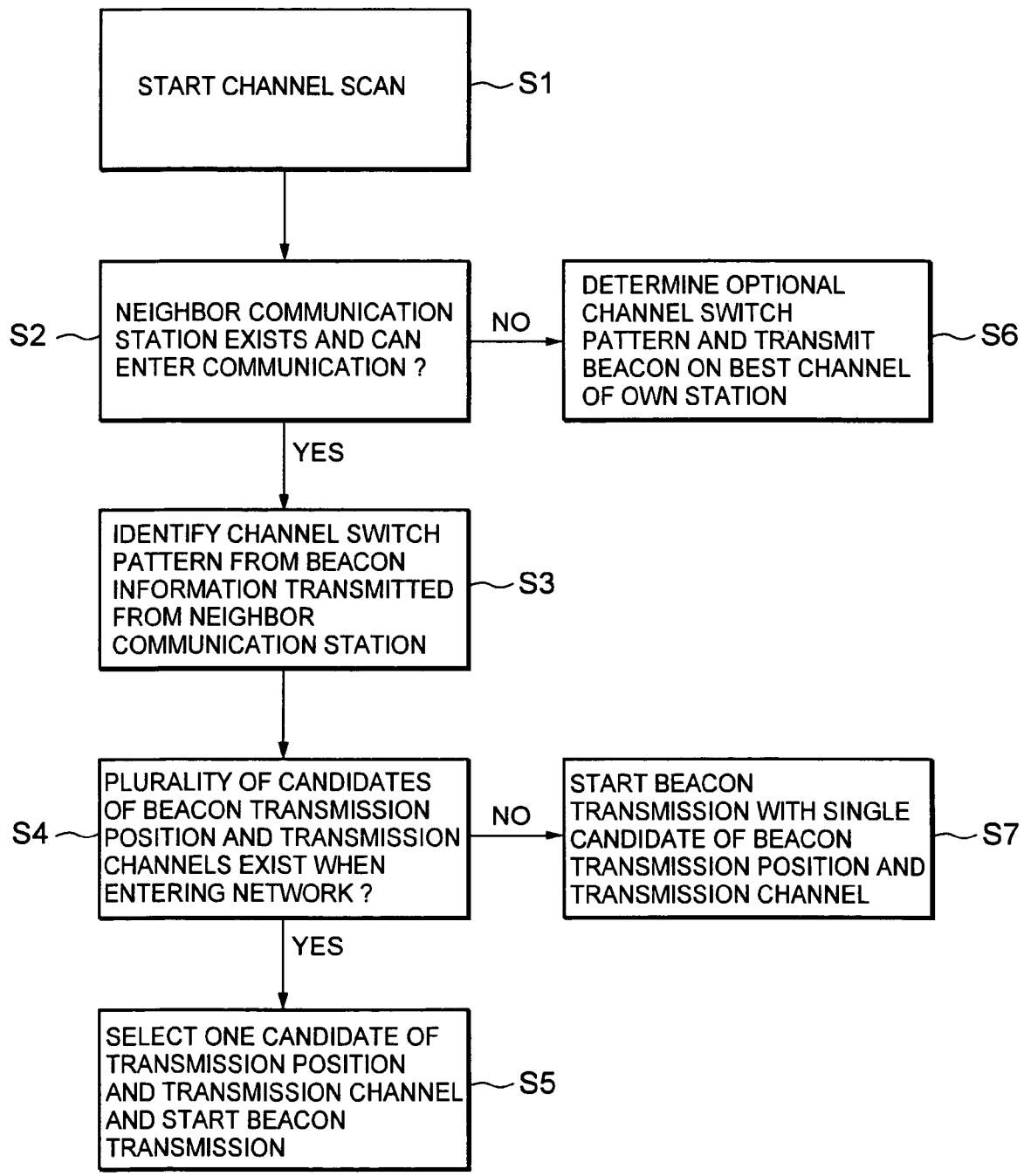
FIG. 14 is a flowchart showing fundamental operation procedures for a station newly entering in a wireless communication environment of a multi-channel self-organized type according to the present invention.

FIG. 14 illustrates in the form of a flow chart the fundamental operation procedure for the wireless communication apparatus 100 operating as the communication station to newly enter a multi-channel self-organized distribution type wireless communication environment of this embodiment. In the example shown, interference with a neighbor system is not considered. This operation procedure is realized actually by the central control unit 103 executing an execution command program stored in the information storage unit 113.

First, a scan operation starts detecting a beacon transmitted from another station in some channel (Step S1). It is judged, from analysis of a received beacon and measurement of the communication quality of the channel, whether another communication station exists in a neighboring area and whether it is possible to enter the network (Step S2).

If it is judged that it is not possible for the apparatus 100 to enter the already existing network constituted of neighbor communication stations, an arbitrary channel switching pattern is determined and a beacon is transmitted at the channel where own station considers best (Step S6). A seed used as the basis of generating the determined channel switching pattern is being written in the beacon.

If it is judged that it is possible for the apparatus 100 to enter the already existing network constituted of neighbor communication stations, the beacon information received from the neighbor station is analyzed to identify the channel switching pattern (Step S3). The channel switching pattern can be calculated based upon the seed extracted from the beacon information (as already described).

Next, when the apparatus 100 enters the already existing network of the current channel, it is checked whether there are a plurality of candidates of the beacon transmission position and transmission channel (Step 4).

In a case where a plurality of candidates exist, one of these candidates is selected by a predetermined method, and own beacon transmission timing on the selected channel is determined to start transmitting the beacon at this timing (Step S5). The seed used for the basis of generating the selected channel switching pattern is being written in the beacon. In this case, the communication station may determine the beacon transmission timing so that timings are distributed time sequentially in the transmission frame (refer to FIG. 4) on the selected channel. In order to effectively use communication resources, the transmission channel may be determined so that the channels are also distributed on the frequency axis (refer to FIG. 12).

On the other hand, in a case where a plurality of candidates of the beacon transmission position and transmission channel do not exist, a single candidate is selected and own beacon transmission timing is determined on the selected channel to start transmitting the beacon at this timing (Step S7). The seed used for the basis of generating the selected channel switching pattern is being written in the beacon.

Figure 15:
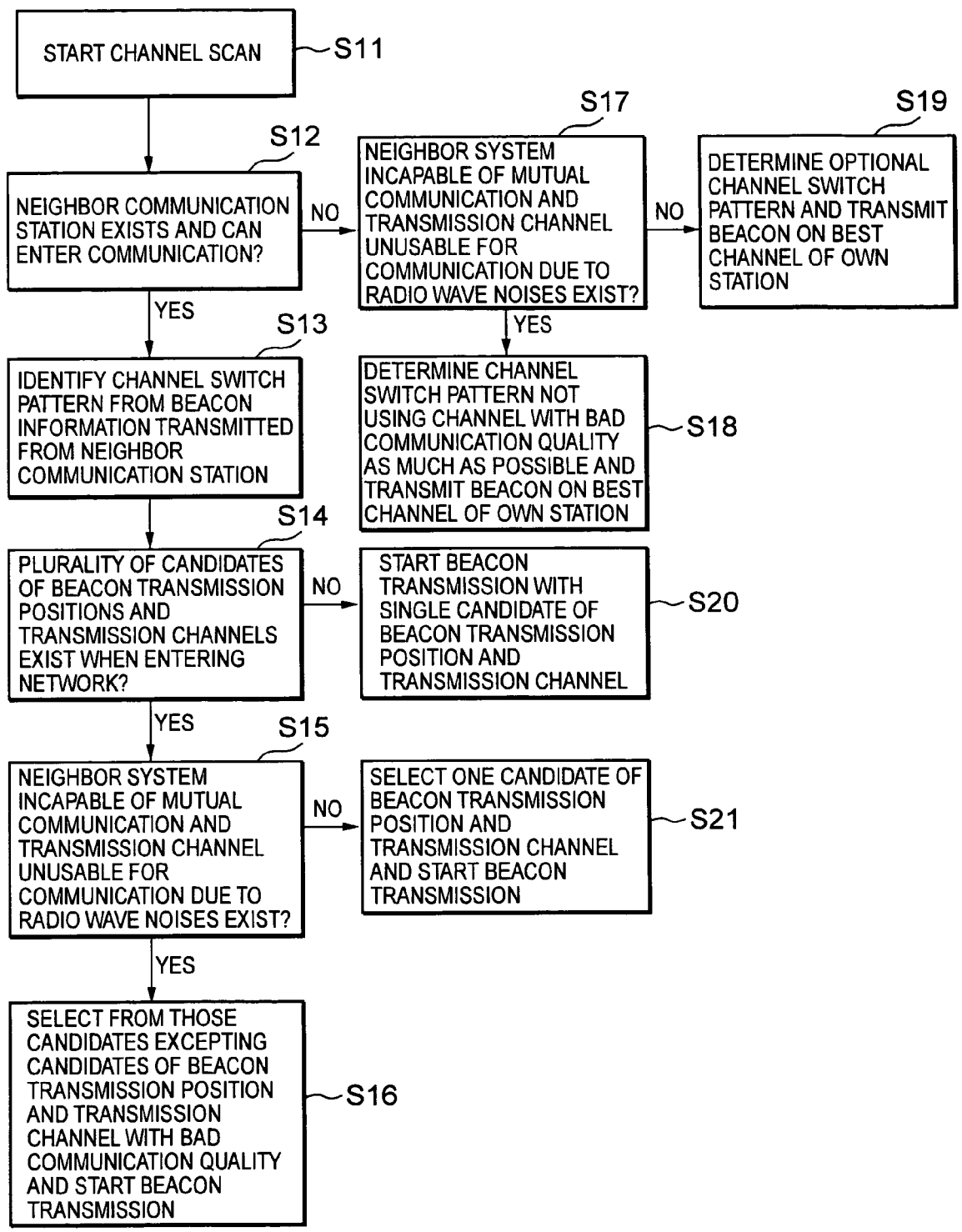
FIG. 15 is a flowchart showing another example of fundamental operation procedures for a station newly entering in the wireless communication environment of the multi-channel self-organized type according to the present invention.

FIG. 15 illustrates in the form of a flow chart the fundamental operation procedure for the wireless communication apparatus 100 operating as the communication station to newly enter a multi-channel self-organized distribution type wireless communication environment of this embodiment. In the example shown, interference with a neighbor system is considered. This operation procedure is realized actually by the central control unit 103 executing an execution command program stored in the information storage unit 113.

First, a scan operation starts detecting a beacon transmitted from another station in some channel (Step S11). It is judged, from analysis of a received beacon and measurement of the communication quality of the channel, whether another communication station exists in a neighboring area and whether it is possible to enter the network (Step S12).

If it is judged that it is not possible for the apparatus 100 to enter the already existing network constituted of neighbor communication stations, it is further judged whether there exists a neighbor system unable to communicate with each other or a transmission channel unsuitable for communication (channel having a bad communication quality) due to interference radio waves, noises or the like (Step S17).

If the transmission channel unsuitable for communication does not exist, an arbitrary channel switching pattern is determined and a beacon is transmitted at the channel where own station considers best (Step S19). A seed used as the basis of generating the determined channel switching pattern is being written in the beacon.

If the transmission channel unsuitable for communication exists, a channel transition pattern which does not use as much as possible a channel having a bad communication quality is determined and a beacon is transmitted at the channel where own station considers best (Step S18). A seed used as the basis of generating the determined channel switching pattern is being written in the beacon.

If it is judged at Step S12 that it is possible for the apparatus 100 to enter the already existing network constituted of neighbor communication stations, the beacon information received from the neighbor station is analyzed to identify the channel switching pattern (Step S13). The channel switching pattern can be calculated based upon the seed extracted from the beacon information (as already described).

Next, when the apparatus enters the already existing network of the current channel, it is checked whether there are a plurality of candidates of the beacon transmission position and transmission channel (Step S14).

If a plurality of candidates of the beacon transmission position and transmission channel do not exist, a single candidate is selected, own beacon transmission timing on the selected channel is determined and a beacon is transmitted at this timing (Step S20). A seed used as the basis of generating the determined channel switching pattern is being written in the beacon.

If a plurality of candidates of the beacon transmission position and transmission channel exist, it is further judged whether there exists a neighbor system unable to communicate with each other or a transmission channel unsuitable for communication (channel having a bad communication quality) due to interference radio waves, noises or the like (Step S15).

If the transmission channel unsuitable for communication exists, one of these candidates is selected, own beacon transmission timing on the selected channel is determined, and a beacon starts being transmitted at this timing (Step S21). In this case, the communication station may determine the beacon transmission timing so that timings are distributed time sequentially in the transmission frame of the selected channel. In order to effectively use communication resources, the transmission channel may be determined so that the channels are distributed on the frequency axis (same as described above).

If the transmission channel unsuitable for communication exists, one of these candidates excluding those having a bad communication quality is selected by a predetermined method, own beacon transmission timing on the selected channel is determined, and a beacon starts being transmitted at this timing (Step S16). A seed used as the basis of generating the determined channel switching pattern is being written in the beacon. In this case, the communication station may determine the beacon transmission timing so that timings are distributed time sequentially in the transmission frame of the selected channel. In order to effectively use communication resources, the transmission channel may be determined so that the channels are distributed on the frequency axis (same as described above).

Figure 16:
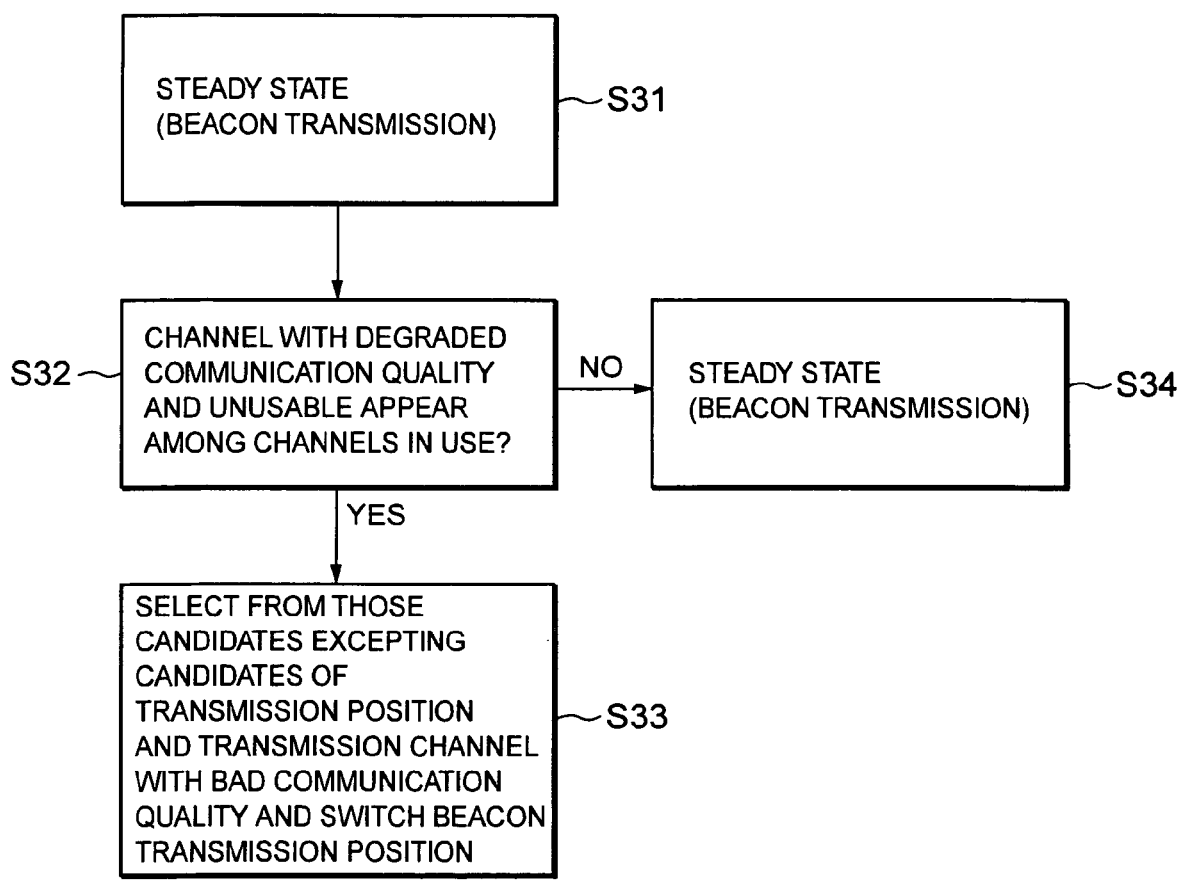
FIG. 16 is a flowchart showing operation procedures of a communication station when interference occurs.
Figure 17:
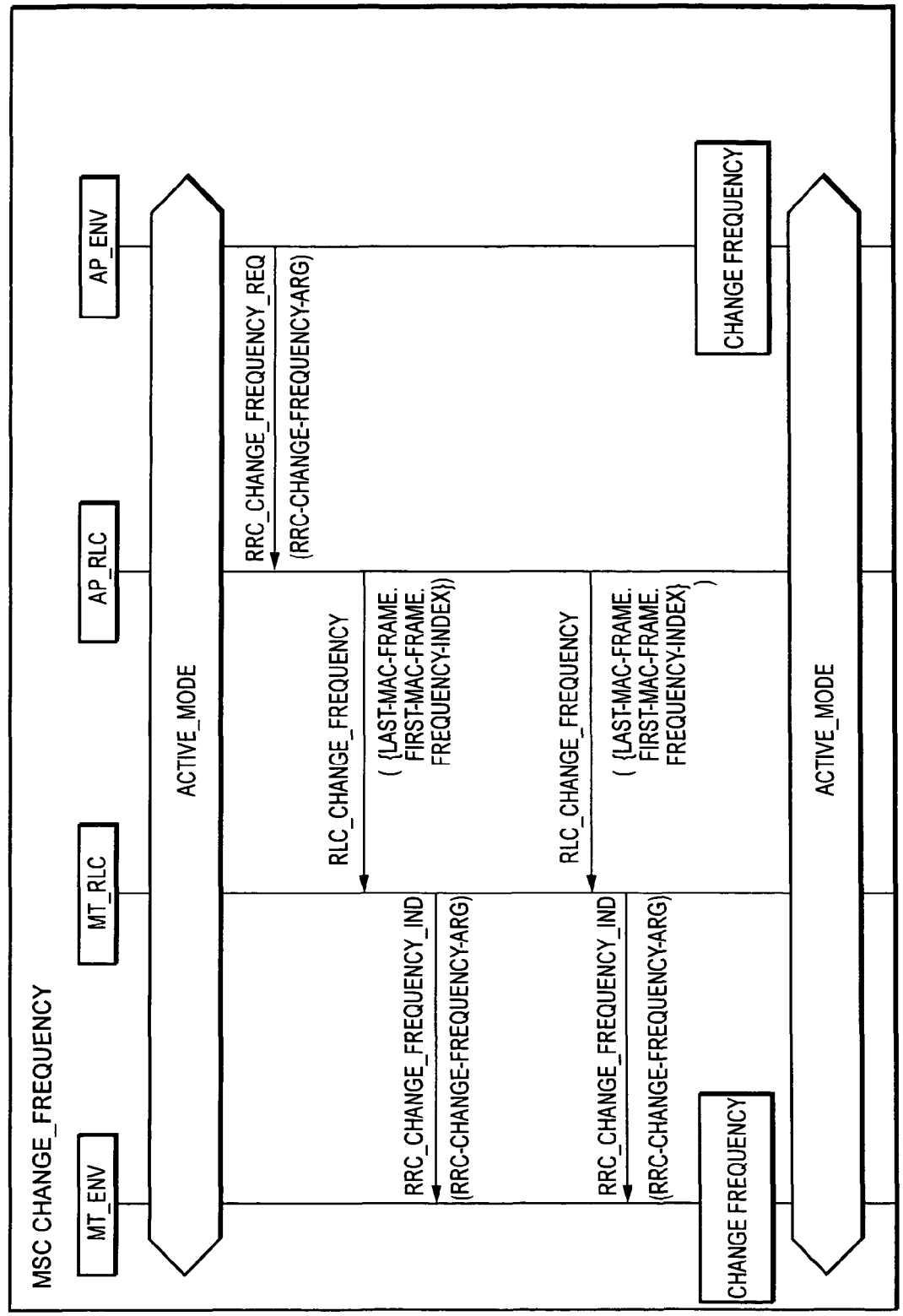
FIG. 17 is a view showing how AP repeatedly notifies to change a frequency channel and AP and MT switch the channel concurrently.
Figure 18:
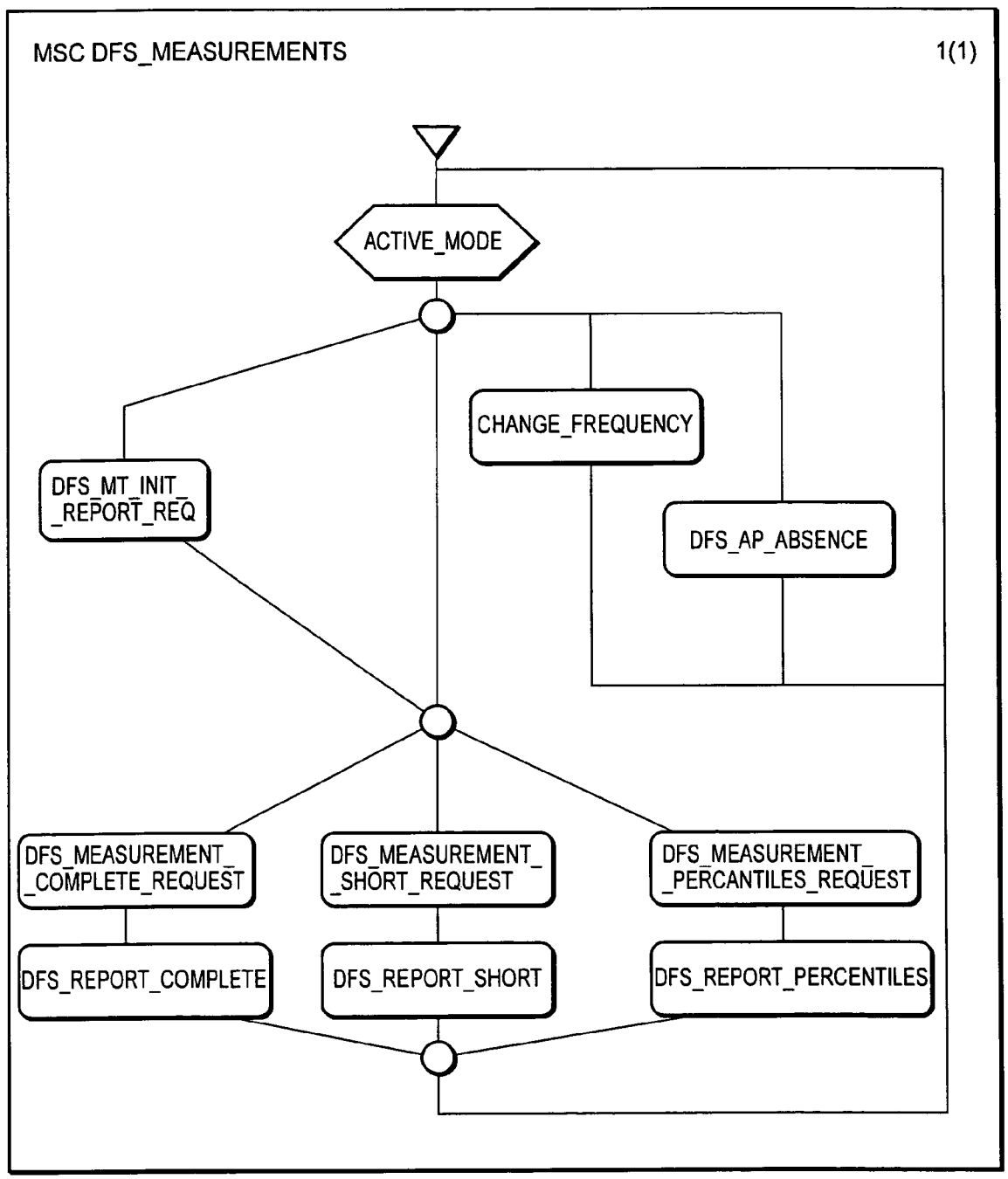
FIG. 18 is a view showing operation procedures for determining whether or not the frequency channel should be switched on the initiative of AP.

FIG. 16 illustrates in the form of a flow chart the operation procedure of a communication station when interference occurs. This operation procedure is realized actually by the central control unit 103 executing an execution command program stored in the information storage unit 113.

In the steady state, a communication station executes a transmission operation of a beacon every predetermined transmission frame period (Step S31). A seed used as the basis of generating the determined channel switching pattern is being written in the beacon.

It is judged whether the communication quality of the currently used channel is degraded or a channel not durable in use appears (Step S32).

During the period while any degradation of the communication quality on each channel does not occur, the beacon transmission operation in the steady state continues (Step S34).

If the communication quality is degraded on some channel, one of these candidates of the beacon transmission timing and transmission channel excluding those having a bad communication quality is selected by a predetermined method, and own beacon transmission timing on the selected channel is switched (Step S33). In this case, the communication station may determine the beacon transmission timing so that timings are distributed time sequentially in the transmission frame of the selected channel. In order to effectively use communication resources, the transmission channel may be determined so that the channels are distributed on the frequency axis (same as described above).

The present invention has been described in detail with reference to particular embodiments. However, it is obvious that the person skilled in the art can make modifications and alternatives of the embodiments without departing from the gist of the present invention. Namely, the present invention has been disclosed illustratively, and the contents described in the specification should not be construed limitedly. In order to judge the gist of the present invention, claims described below should be considered.

What is claimed is:

1. A wireless communication system for forming a network with a plurality of wireless communication apparatuses without relationship between a controlling station and a controlled station in a communication environment having a plurality of channels, wherein:
   each of said wireless communication apparatuses:
   notifies beacon information containing seed information corresponding uniquely to a beacon transmission timing and a transmission channel of its own station, and
   when one of said wireless communication apparatuses newly participates in the network, the new entry apparatus identifies a channel switching pattern for beacon transmission on each channel in accordance with the seed information in the information of a beacon received from another station, the channel switching pattern identifying an order in which the new entry apparatus will transmit on each channel, selects one candidate of own station from candidates not in use of the beacon transmission timing and transmission channel, and a transmits the beacon information.

2. The wireless communication system according to claim 1, wherein each of said wireless communication apparatuses determines the transmission channel of the beacon information from channels favorable to its own station.

3. The wireless communication system according to claim 1, wherein each of said wireless communication apparatuses determines the beacon transmission timing and the transmission channel from candidates from which a channel whose communication quality is not favorable to its own station is excluded at the time of new entry.

4. The wireless communication system according to claim 1, wherein each of said wireless communication apparatuses determines the beacon transmission timing in a distributed manner on a time basis with regard to other stations on the determined beacon transmission channel at the time of new entry.

5. The wireless communication system according to claim 1, wherein each of said wireless communication apparatuses determines the beacon transmission channel in a distributed manner on a frequency axis with regard to other stations at the time of new entry.

6. The wireless communication system according to claim 1, wherein, in a case where some of the frequency channels is degraded in communication quality in a steady state, each of said wireless communication apparatuses determines the beacon transmission timing and the transmission channel to switch a beacon transmission position and the transmission channel from candidates excluding the degraded channel.

7. A wireless communication apparatus operating in a wireless communication environment without relationship between a controlling station and a controlled station in which a plurality of channels are prepared, said wireless communication apparatus comprising:
   means for transmitting and receiving wireless data;
   means for controlling a transmission/reception operation of the wireless data by said means for transmitting and receiving;
   means for determining a beacon transmission timing and a transmission channel of its own station;
   means for generating seed information uniquely corresponding to a channel switching pattern defining the determined beacon transmission timing and the transmission channel of the own station, the channel switching pattern identifying an order in which the wireless communication apparatus will transmit on each channel; and
   means for notifying beacon information to other stations including the generated seed information every predetermined frame period within a communication range of said means for transmitting and receiving.

8. The wireless communication apparatus according to claim 7, wherein said means for determining determines the transmission channel of the beacon information from channels favorable to the own station.

9. The wireless communication apparatus according to claim 7, further comprising means for analyzing the beacon information received from another station, wherein said means for determining refers to a channel switching pattern identified on the basis of the seed information taken out from the received beacon information to select the beacon transmission timing and the transmission timing to use from candidates not in use at the time of new entry.

10. The wireless communication apparatus according to claim 9, wherein said means for determining determines the beacon transmission timing and the transmission channel from candidates from which a channel whose communication quality is not favorable to its own station is excluded at the time of new entry.

11. The wireless communication apparatus according to claim 9, wherein said means for determining determines the beacon transmission timing in a distributed manner on a time basis with regard to other stations on the determined beacon transmission channel at the time of new entry.

12. The wireless communication apparatus according to claim 9, wherein said means for determining determines the beacon transmission channel in a distributed manner on a frequency axis with regard to other stations at the time of new entry.

13. The wireless communication apparatus according to claim 9, wherein, in a case where some of the frequency channels is degraded in communication quality in a steady state, said means for determining determines the beacon transmission timing and the transmission channel to switch a beacon transmission position and the transmission channel from candidates excluding the degraded channel.

14. A wireless communication method for operating in a wireless communication environment without relationship between a controlling station and a controlled station in which a plurality of channels are prepared, said wireless communication method comprising:

determining a beacon transmission timing and a transmission channel of its own station;

generating seed information uniquely corresponding to a channel switching pattern defining the determined beacon transmission timing and the transmission channel of the own station, the channel switching pattern identifying an order in which the own station will transmit on each channel; and notifying to other stations of beacon information including the generated seed information every predetermined frame period within a communication range of said own station.

15. The wireless communication method according to claim 14, wherein in said determining, the transmission channel of the beacon information is determined from channels favorable to the own station.

16. The wireless communication method according to claim 14, further comprising:

analyzing the beacon information received from another station, wherein, in said determining, a channel switching pattern identified on the basis of the seed information taken out from the received beacon information is referred to select the beacon transmission timing and the transmission timing to use from candidates not in use at the time of new entry.

17. The wireless communication method according to claim 16, wherein, in said determining, the beacon transmission timing and the transmission channel is determined from candidates from which a channel whose communication quality is not favorable to its own station is excluded at the time of new entry.

18. The wireless communication method according to claim 16, wherein, in said determining, the beacon transmission timing is determined so as to be distributed on a time basis with regard to other stations on the determined beacon transmission channel at the time of new entry.

19. The wireless communication method according to claim 16, wherein, in said determining, the beacon transmission channel is determined so as to be distributed on a frequency axis with regard to other stations at the time of new entry.

20. The wireless communication method according to claim 16, wherein, in a case where some of the frequency channels is degraded in communication quality in a steady state, in said determining, the beacon transmission timing and the transmission channel are determined to switch a beacon transmission position and the transmission channel from candidates excluding the degraded channel.

21. A non-transitory computer readable medium including computer executable instructions, wherein the instructions, when executed by a processor, cause the processor to perform a method for operating in a wireless communication environment without relationship between a controlling station and a controlled station in which a plurality of channels are prepared, said method comprising:

determining a beacon transmission timing and a transmission channel of its own station;

generating seed information uniquely corresponding to a channel switching pattern defining the determined beacon transmission timing and the transmission channel of the own station, the channel switching pattern identifying an order in which the own station will transmit on each channel; and notifying to other stations of beacon information including the generated seed information every predetermined frame period within a communication range of said own station.

22. A wireless communication apparatus for forming a network with a plurality of wireless communication apparatuses without relationship between a controlling station and a controlled station in a communication environment having a plurality of channels, the apparatus comprising:

a beacon generation unit configured to transmit beacon information containing seed information corresponding uniquely to a beacon transmission timing and a transmission channel of the apparatus;

a pattern switching identification unit configured to identify a channel switching pattern for beacon transmission on each channel in accordance with the seed information in the information of a beacon received from another apparatus, the channel switching pattern identifying an order in which the apparatus will transmit on each channel; and a timing and channel selection unit configured to select one beacon transmission timing and transmission channel not being used by another apparatus.

23. The wireless communication apparatus according to claim 22, wherein the beacon generation unit is configured to select the transmission channel of the beacon information from channels favorable to its own station.

24. The wireless communication apparatus according to claim 22, wherein the timing and channel selection unit configured to select the beacon transmission timing and the transmission channel from candidates from which a channel whose communication quality is not favorable to the apparatus is excluded at the time of new entry of the apparatus to a network.

25. The wireless communication apparatus according to claim 22, wherein the beacon generation unit is configured to determine the beacon transmission timing in a distributed manner on a time basis with regard to other apparatuses on the determined beacon transmission channel at a time of new entry of the apparatus to a network.

* * * * *